(12) United States Patent
Sakai

(10) Patent No.: US 8,237,961 B2
(45) Date of Patent: Aug. 7, 2012

(54) VIRTUAL DEVICE MANAGEMENT METHOD AND MANAGEMENT APPARATUS

(75) Inventor: Tetsuo Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 12/233,560

(22) Filed: Sep. 18, 2008

(65) Prior Publication Data

US 2009/0094604 A1    Apr. 9, 2009

(30) Foreign Application Priority Data

Oct. 3, 2007   (JP) ................... 2007-260355

(51) Int. Cl.
*G06F 15/00* (2006.01)
*H04N 1/40* (2006.01)

(52) U.S. Cl. ...................... 358/1.15; 358/1.13
(58) Field of Classification Search .............. None
See application file for complete search history.

(56) References Cited

U.S. PATENT DOCUMENTS

| | | | |
|---|---|---|---|
| 5,659,795 A * | 8/1997 | Duvall et al. | 710/15 |
| 6,525,721 B1 * | 2/2003 | Thomas et al. | 345/600 |
| 6,633,400 B1 * | 10/2003 | Sasaki et al. | 358/1.15 |
| 7,124,265 B2 * | 10/2006 | Nagasoe et al. | 711/163 |
| 7,218,405 B1 * | 5/2007 | Aschenbrenner et al. | 358/1.15 |
| 7,236,992 B2 * | 6/2007 | Yano et al. | 1/1 |
| 7,360,154 B2 * | 4/2008 | Gale | 715/228 |
| 2004/0153530 A1 | 8/2004 | Machida | |
| 2004/0243697 A1 | 12/2004 | Otsuka et al. | |
| 2005/0002051 A1 | 1/2005 | Kurumida et al. | |

FOREIGN PATENT DOCUMENTS

JP    9-146731    6/1997

OTHER PUBLICATIONS

European Search Report dated May 18, 2012 issued in corresponding European Patent Application No. 08165851.0.

\* cited by examiner

*Primary Examiner* — Gabriel Garcia
(74) *Attorney, Agent, or Firm* — Fitzpatrick, Cella, Harper & Scinto

(57) ABSTRACT

A management apparatus (102) for managing a plurality of actual devices (104-106) and virtual devices (603, 703), each virtual device providing an operation constructed by combining the functions of the plurality of actual devices detects (503, S1104) a change of an optional function of the actual devices. The apparatus changes (502, S1108), in correspondence with the detected change of the optional function, the attribute of the first virtual device including an actual device of which the optional function has been changed. When the second virtual device which has the same attribute as the changed attribute of the first virtual device is determined, the apparatus changes (508, S1115) the configuration of the second virtual device so as to use the actual device. The apparatus inquires (507, S1114) of a user whether or not to reconstruct the second virtual device so as to use the actual device.

21 Claims, 22 Drawing Sheets

FIG. 8

| VIRTUAL DEVICE INFORMATION | VIRTUAL DEVICE GROUP | PRINT COUNT | FUNCTION | | |
|---|---|---|---|---|---|
| | | | Scan | PDL to IMAGE | Print |
| VIRTUAL DEVICE 1 (NORMAL PRINT ATTRIBUTE) | Group 1 | 1000 | DEVICE A | DEVICE B | DEVICE C |
| VIRTUAL DEVICE 2 (STAPLE PRINT ATTRIBUTE) | Group 1 | 10 | DEVICE A | DEVICE B | DEVICE B |
| VIRTUAL DEVICE 3 | Group 2 | ... | ... | ... | ... |
| ... | | | | | |

FIG. 9

| VIRTUAL DEVICE NAME | VIRTUAL DEVICE GROUP INFORMATION | PRINT ATTRIBUTE | | | | | | |
|---|---|---|---|---|---|---|---|---|
| | | SINGLE-SIDED | DOUBLE-SIDED | SORT | STAPLE-SORT | BOOKBINDING PRINTING | Z-FOLDING | ... |
| VIRTUAL DEVICE 1 | Group 1 | ○ | ○ | × | × | × | × | ... |
| VIRTUAL DEVICE 2 | Group 1 | ○ | ○ | ○ | ○ | ○ | × | ... |
| VIRTUAL DEVICE 3 | Group 2 | ... | ... | ... | ... | ... | ... | ... |
| ... | ... | ... | ... | ... | ... | ... | ... | ... |

| VIRTUAL DEVICE INFORMATION | VIRTUAL DEVICE GROUP | PRINT COUNT | FUNCTION | | | |
|---|---|---|---|---|---|---|
| | | | Scan | PDL to IMAGE | Print | ... |
| VIRTUAL DEVICE 1 (NORMAL PRINT ATTRIBUTE) | Group 1 | 1000 | DEVICE A | DEVICE B | DEVICE C | ... |
| VIRTUAL DEVICE 2 (STAPLE PRINT ATTRIBUTE) | Group 1 | 10 | DEVICE A | DEVICE B | DEVICE C | ... |
| VIRTUAL DEVICE 3 | Group 2 | ... | ... | ... | ... | |
| ... | | | | | | |

| OPTION RESOURCE TYPE | PRINT FUNCTION ATTRIBUTE |
|---|---|
| FORMAT 1 OF FORM | FORM PRINT WORKFLOW 1 |
| FORMAT 2 OF FORM | FORM PRINT WORKFLOW 2 |
| ... | |

| VIRTUAL DEVICE INFORMATION | VIRTUAL DEVICE GROUP | PRINT COUNT | FUNCTION | | |
|---|---|---|---|---|---|
| | | | Scan | PDL to IMAGE | Print |
| VIRTUAL DEVICE 1 (NORMAL PRINT ATTRIBUTE) | Group 1 | 1000 | DEVICE A | DEVICE B | DEVICE C |
| VIRTUAL DEVICE 2 (FORM PRINT ATTRIBUTE) | Group 1 | 10 | DEVICE A | DEVICE B | DEVICE B |
| VIRTUAL DEVICE 3 | Group 2 | ... | ... | ... | ... |
| ... | | | | | |

| VIRTUAL DEVICE NAME | VIRTUAL DEVICE GROUP INFORMATION | PRINT ATTRIBUTE ||||||||
| --- | --- | --- | --- | --- | --- | --- | --- | --- |
| | | SINGLE-SIDED | DOUBLE-SIDED | SORT | STAPLE-SORT | BOOKBINDING PRINTING | FORM PRINTING 1 | FORM PRINTING 2 | ... |
| VIRTUAL DEVICE 1 | Group 1 | ○ | ○ | ○ | ○ | ○ | ○ | ○ | ... |
| VIRTUAL DEVICE 2 | Group 1 | ○ | ○ | ○ | ○ | ○ | × | × | ... |
| VIRTUAL DEVICE 3 | Group 2 | ... | ... | ... | ... | ... | ... | ... | ... |
| ... | | | | | | | | | |

2300

| DEVICE NAME | RESOURCE DATA INFORMATION |
|---|---|
| DEVICE B | FORMAT 1 OF FORM |
| DEVICE B | FORMAT 2 OF FORM |
| DEVICE C | - |
| . | . |

2400

| DEVICE NAME | RESOURCE DATA INFORMATION |
|---|---|
| DEVICE B | FORMAT 1 OF FORM |
| DEVICE B | FORMAT 2 OF FORM |
| DEVICE C | FORMAT 1 OF FORM |
| DEVICE C | FORMAT 2 OF FORM |
| . | . |

FIG. 27

| VIRTUAL DEVICE INFORMATION | VIRTUAL DEVICE GROUP | PRINT COUNT | FUNCTION | | |
|---|---|---|---|---|---|
| | | | Scan | PDL to IMAGE | Print |
| VIRTUAL DEVICE 1 (NORMAL PRINT/ FORM PRINT ATTRIBUTE) | Group 1 | 1000 | DEVICE A | DEVICE B | DEVICE C |
| VIRTUAL DEVICE 3 | Group 2 | ... | ... | ... | ... |
| ... | | | | | |

2001 2002 2003 2004

2000"

VIRTUAL DEVICE MANAGEMENT METHOD AND MANAGEMENT APPARATUS

BACKGROUND OF THE INVENTION

1. Field of the Invention

The present invention relates to a virtual device management method and management apparatus in a system which manages, as virtual devices, image processing apparatuses, such as a plurality of printing apparatuses.

2. Description of the Related Art

A management system which manages a plurality of printing apparatuses as virtual devices sometimes permits/prohibits the use of an optional function of a printing apparatus. Conventionally, it is popular to notify the user via a user interface whether he can use an optional function of a printing apparatus, depending on whether the optional function is incorporated in the printing apparatus, or the capability of the optional function, as disclosed in Japanese Patent Laid-Open No. 09-146731.

However, the conventional method as disclosed in Japanese Patent Laid-Open No. 09-146731 suffers the following problems.

Assume that a plurality of print output systems are defined for the user, and different output systems are set depending on print attributes. A remote device may then carry out output requiring a stapler or finisher on a remote printer, and carry out other output set with a high output frequency attribute on a nearby device. This is because in an environment such as an office a multi-function device (multi-function peripheral) is considered to be shared between departments, and installed in a shared space distant from the department to which the user belongs. Further, assume that a printing apparatus capable of only printing at relatively low cost is installed near the department to which the user belongs.

In this environment, even if a finisher or the like is mounted in a nearby output device, a remote device outputs the results of printing using a stapler or finisher according to the conventional method.

Even if output devices become equal in capability, items of repetitive output system information remain held, and information unnecessary for the user continues to accumulate.

This problem is not limited to print output systems, and also arises when managing a plurality of actual devices as virtual devices in the peripheral device of a computer system.

SUMMARY OF THE INVENTION

It is, therefore, an object of the present invention to provide a virtual device management method and management apparatus capable of flexibly reconstructing virtual devices in accordance with the function extension of actual devices or the like.

It is another object of the present invention to efficiently manage virtual device management information when items of virtual device configuration information overlap each other as a result of reconstructing virtual devices after inquiring of the user whether or not to reconstruct the virtual devices.

According to one aspect of the present invention, a management apparatus for managing a plurality of actual devices and virtual devices, each virtual device providing an operation constructed by combining functions of the plurality of actual devices, comprises:

a detection unit adapted to detect a change of an optional function of an actual device;

a change unit adapted to change, in correspondence with the change of the optional function detected by the detection unit, an attribute of a first virtual device including an actual device of which the optional function has been changed;

a determination unit adapted to determine a second virtual device which has the same attribute as the attribute of the first virtual device that has been changed by the change unit; and a reconfiguration unit adapted to, in the case that the determination unit determines a second virtual device having the same attribute, change the configuration of the second virtual device so as to use the actual device of which the change of the optional function has been detected by the detection unit.

According to another aspect of the present invention, a management apparatus for managing a plurality of actual devices and virtual devices each providing an operation constructed by combining functions of the plurality of actual devices, comprises:

a detection unit adapted to detect a change of an optional function of an actual device;

an inquiry unit adapted to identify a virtual device in which an attribute to be enabled in correspondence with the optional function, the change of which has been detected by the detection unit, has already been enabled, and to inquire of a user whether or not to change a configuration of the identified virtual device so as to use the actual device of which the change of the optional function has been detected by the detection unit; and a reconfiguration unit adapted to change, based on a user instruction in response to the inquiry by the inquiry unit, the configuration of the virtual device so as to use the actual device of which the change of the optional function has been detected by the detection unit.

According to still another aspect of the present invention, a method of managing a plurality of actual devices and virtual devices each providing an operation constructed by combining functions of the plurality of actual devices, comprises the steps of:

detecting a change of an optional function of an actual device;

changing, in correspondence with the change of the optional function detected in the detecting step, an attribute of a first virtual device including an actual device of which the optional function has been changed;

determining a second virtual device which has the same attribute as the attribute of the first virtual device that has been changed in the changing step; and if the determining step determines a second virtual device having the same attribute, changing the configuration of the second virtual device so as to use the actual device of which the change of the optional function has been detected in the detecting step.

According to still another aspect of the present invention, a method of managing a plurality of actual devices and virtual devices each providing an operation constructed by combining functions of the plurality of actual devices, comprises the steps of:

detecting a change of an optional function of the actual devices;

identifying a virtual device in which an attribute to be enabled in correspondence with the optional function, the change of which has been detected in the detecting step, has already been enabled, and inquiring of a user whether or not to change a configuration of the identified virtual device so as to use the actual device of which the change of the optional function has been detected in the detecting step; and changing, based on a user instruction in response to the inquiry in the inquiring step, the configuration of the virtual device so as to use the actual device of which the change of the optional function has been detected in the detecting step.

According to still yet another aspect of the present invention, a management apparatus for managing a plurality of actual devices and virtual devices, each virtual device providing an operation constructed by combining functions of the plurality of actual devices, comprises:

detection means for detecting a change of an optional function of an actual device;

change means for changing, in correspondence with the change of the optional function detected by the detection means, an attribute of a first virtual device including an actual device of which the optional function has been changed;

determination means for determining a second virtual device which has the same attribute as the attribute of the first virtual device that has been changed by the change means; and reconfiguration means for, in the case that the determination means determines a second virtual device having the same attribute, changing the configuration of the second virtual device so as to use the actual device of which the change of the optional function has been detected by the detection means.

According to yet still another aspect of the present invention, a management apparatus for managing a plurality of actual devices and virtual devices each providing an operation constructed by combining functions of the plurality of actual devices, comprises:

detection means for detecting a change of an optional function of an actual device;

inquiry means for identifying a virtual device in which an attribute to be enabled in correspondence with the optional function, the change of which has been detected by the detection means, has already been enabled, and to inquire of a user whether or not to change a configuration of the identified virtual device so as to use the actual device of which the change of the optional function has been detected by the detection means; and reconfiguration means for changing, based on a user instruction in response to the inquiry by the inquiry means, the configuration of the virtual device so as to use the actual device of which the change of the optional function has been detected by the detection means.

The present invention can flexibly reconstruct virtual devices in accordance with the function extension of actual devices or the like.

The present invention can efficiently manage virtual device management information when items of virtual device configuration information overlap each other as a result of reconstructing virtual devices after inquiring of the user whether or not to reconstruct the virtual devices.

Further features of the present invention will become apparent from the following description of exemplary embodiments with reference to the attached drawings.

BRIEF DESCRIPTION OF THE DRAWINGS

FIG. 8 is a table showing an example of a virtual device configuration management table in the first embodiment;

FIG. 9 is a table showing an example of a management device print-attribute correspondence table which manages designatable print attributes in a virtual device in the first embodiment;

FIG. 17 is a table showing an example of a virtual device configuration management table after changing the configuration in the first embodiment;

FIG. 19 is a table showing an example of a correspondence table of option resources and compatible print attributes in the second embodiment;

FIG. 20 is a table showing an example of a virtual device configuration management table in the second embodiment;

FIG. 21 is a table showing an example of a virtual device print-attribute correspondence table in the second embodiment;

FIG. 27 is a table showing an example after deleting repetitive virtual device configuration information in the second embodiment.

DESCRIPTION OF THE EMBODIMENTS

Preferred embodiments of the present invention will be described in detail below with reference to the accompanying drawings. The following embodiments will exemplify a management system for a printing apparatus, but the device is not limited to the printing apparatus and other devices also fall within the scope of the present invention.

<Example of Configuration of Printing Apparatus Management System>

Figure 1:
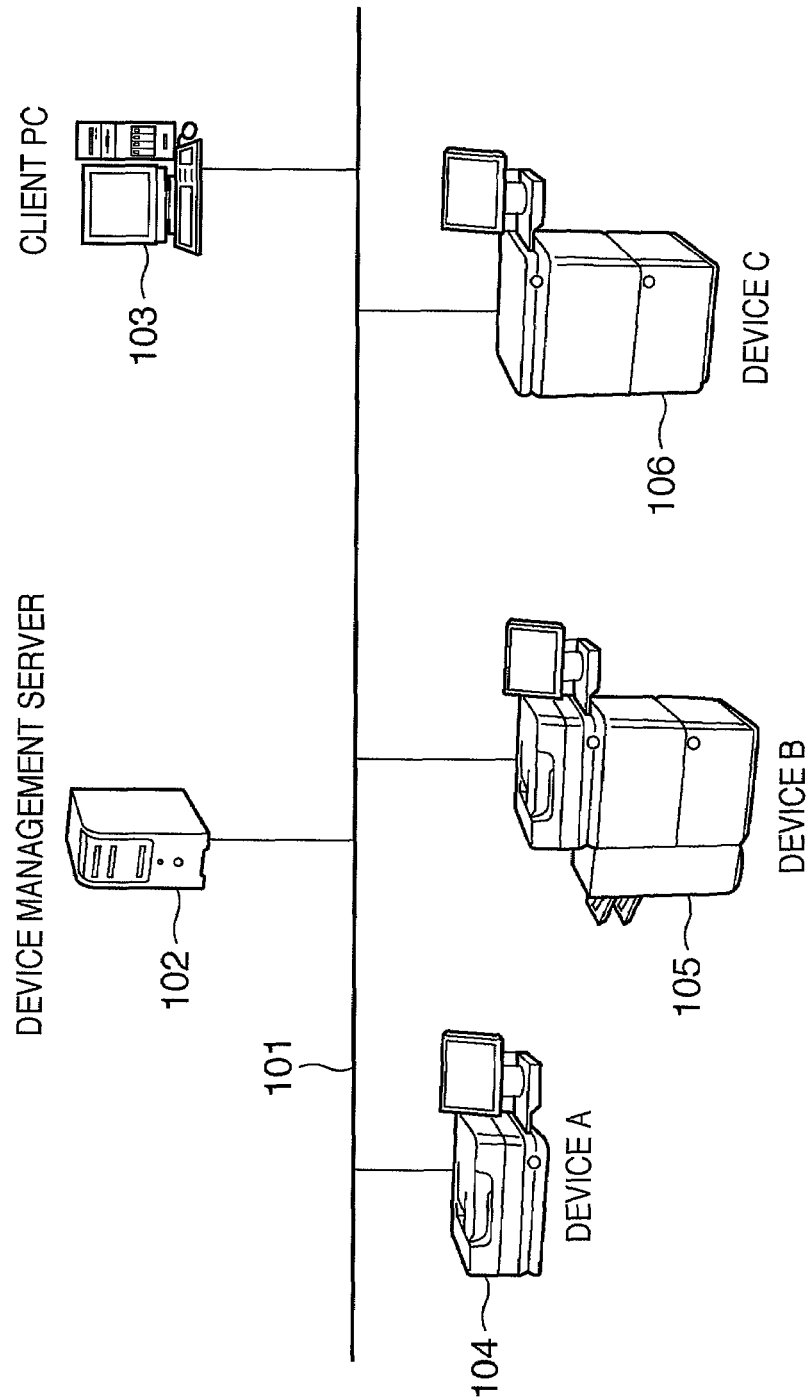
FIG. 1 is a conceptual view showing an example of the configuration of a printing apparatus management system in embodiments.

FIG. 1 is a conceptual view showing an example of the configuration of a printing apparatus management system in embodiments.

In FIG. 1, a physical communication medium 101 such as Ethernet® serves as a transmission path for exchanging communication data. A device management server 102, client personal computer (to be referred to as a PC hereinafter) 103, devices 104 to 106 are connected to the physical communication medium 101.

The device management server 102 is a server PC which stores and executes programs for managing devices. The client PC 103 is connected to a network, and transmits print data and the like in response to a request from a client user. Note that the network allows connecting a plurality of client PCs 103, and the network size determines the upper limit of the number of connected client PCs 103. For descriptive convenience, FIG. 1 shows only one connected client PC 103.

The devices 104 to 106 are devices A to C as printing apparatuses connected to the network. These devices have different functions. In this example, the device A mainly has a scan function, and the device C has scan and print functions, that is, so-called copy and print functions. In addition to the functions of the device C, the device B comprises a finisher, and can output the results of sorting, stapling, bookbinding printing, and the like.

<Examples of Hardware Configurations of Devices>

Figure 2:
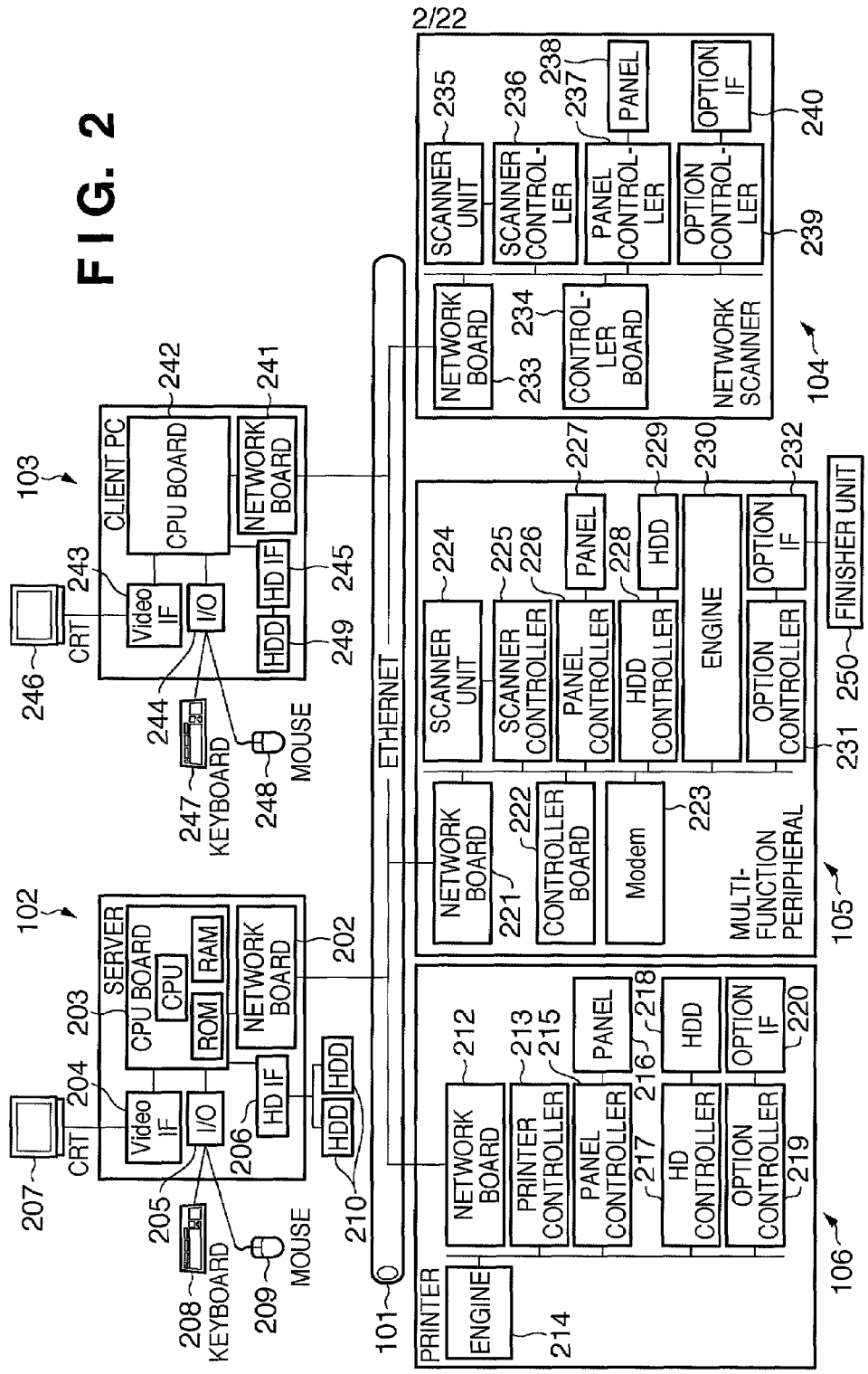
FIG. 2 is a view showing an example of the hardware configuration in the embodiments.

FIG. 2 is a view showing an example of the configurations of the main hardware modules of the respective devices in FIG. 1. The functions of the hardware modules of the respective devices in FIG. 1 will be explained with reference to FIG. 2.

In FIG. 2, a network medium 101 is formed from a physical communication medium identical to that in FIG. 1. The network medium is a physical line which builds a network between devices, and is generally Ethernet®.

(Example of Hardware Configuration of Device Management Server 102)

Hardware modules which construct the device management server 102 are a network board 202, CPU board 203, Video interface (Video_IF) 204, I/O interface (I/O) 205, and hard disk interface (HD_IF) 206.

Further, a CRT 207, keyboard 208, mouse 209, and hard disk drive (HDD) 210 are connected to these structural elements. The hard disk drive 210 ensures high-speed, high-reliability data transfer by parallel-connecting a plurality of hard disk units. In the hard disk drive 210, a database may also be built in accordance with the type of software which runs on the server PC.

(Example of Hardware Configuration of Client PC 103)

Hardware modules which construct the client PC 103 are a network board 241, CPU board 242, Video interface (Video_IF) 243, I/O interface (I/O) 244, and hard disk interface (HD_IF) 245.

Further, a CRT 246, keyboard 247, mouse 248, and hard disk drive (HDD) 249 are connected to these structural elements. The configuration of the hard disk drive 249 is different from that of the device management server 102. Software which runs on the client PC 103 is stored in a hard disk unit connected to the hard disk interface 245. The software is invoked via an OS upon receiving a print request from application software.

(Network Scanner 104: Example of Hardware Configuration of Device A)

The network scanner 104 is made up of hardware modules 233 to 240. That is, the network scanner 104 comprises the network board 233 corresponding to a peripheral device, the controller board 234 for the scanner, the scanner unit 235, and the scanner controller 236. The network scanner 104 also comprises the operation panel controller 237, operation panel 238, option controller 239, and option IF 240.

(Multi-Function Peripheral 105: Example of Hardware Configuration of Device B)

The multi-function peripheral 105 is made up of hardware modules 221 to 232 and 250. That is, the multi-function peripheral 105 comprises the network board 221 corresponding to a peripheral device, the controller board 222 for the multi-function peripheral, the modem 223, the scanner unit 224, and the scanner controller 225. The multi-function peripheral 105 also comprises the operation panel controller 226, operation panel 227, hard disk controller 228, hard disk drive (HDD) 229, and print engine 230. The multi-function peripheral 105 further comprises the option controller 231 and option IF 232. A finisher unit 250 mounted on the option IF 232 is connected to the multi-function peripheral 105.

(Printer 106: Example of Hardware Configuration of Device C)

The printer 106 is made up of hardware modules 212 to 220. That is, the printer 106 comprises the network board 212 corresponding to a peripheral device, the controller board 213 for the printer, and the print engine 214. The printer 106 further comprises the operation panel controller 215, operation panel 216, hard disk controller 217, hard disk drive (HDD) 218, option controller 219, and option IF 220.

<Examples of Software Configurations of Devices>

Examples of the configurations of the software modules of the device management server 102 and client PC 103 will be explained.

(Example of Software Configuration of Device Management Server 102)

Figure 3A:
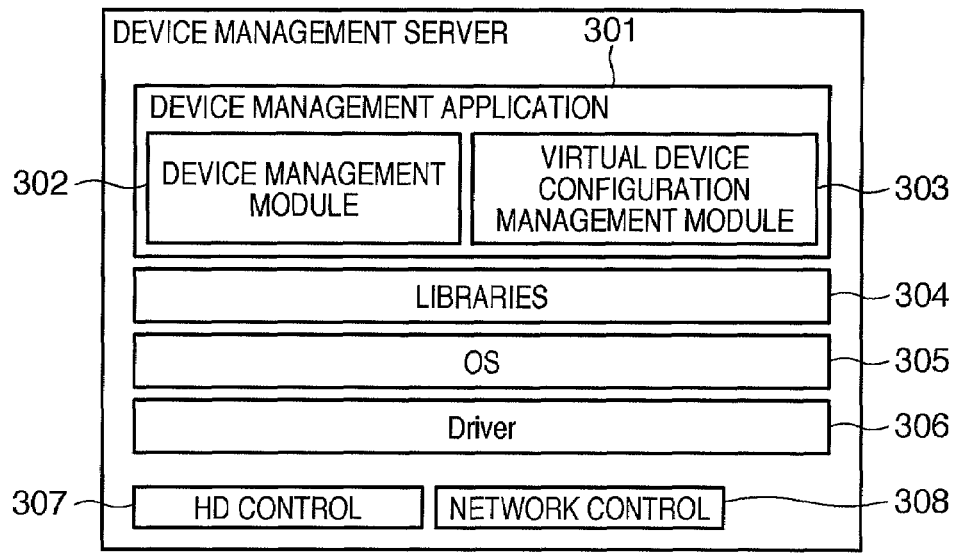
FIG. 3A is a block diagram showing an example of the software configuration of a device management server in the embodiments.

FIG. 3A is a block diagram showing an example of the module configuration of a device management application program on the device management server 102.

A device management application program 301 includes a device management module 302 and virtual device configuration management module 303. The device management module 302 acquires and manages management information of a target device. The virtual device configuration management module 303 manages a virtual device configuration for providing the user with the functions of one virtual device as a result of sharing and combining the functions of the devices 104 to 106.

Libraries 304 are provided by an OS, and are also available as framework functions when building an application program. Driver software (Driver) 306 controls hardware. The driver software 306 also includes a printer driver used to print.

An HD control module 307 and network control module 308 are software components for controlling physical media such as a hard disk and network board.

Under the control of these modules, device management software runs on the device management server 102.

(Example of Software Configuration of Client PC 103)

Figure 3B:
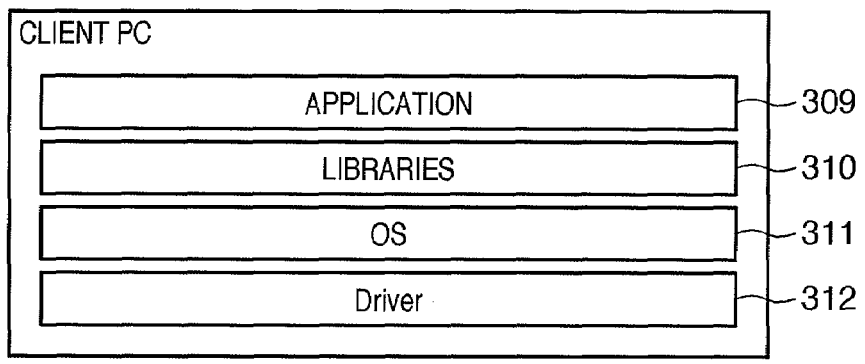
FIG. 3B is a block diagram showing an example of the software configuration of a client PC in the embodiments.

FIG. 3B is a block diagram showing an example of the configuration of software modules on the client PC 103.

An application program 309 runs on the client PC. Typical examples of the application program are document creation software, drawing software, and spreadsheet software. The user of the client PC can install and use arbitrary software. Libraries 310 are prepared on an operating system 311 and assist the operation of the application program 309. Reference numeral 311 denotes an operating system (OS). Driver software programs (Driver) 312 are installed in the OS 311, and include a printer driver for printing, and driver software for driving hardware connected to the PC.

(Example of Module Configuration of Device Management Module 302)

Figure 4:
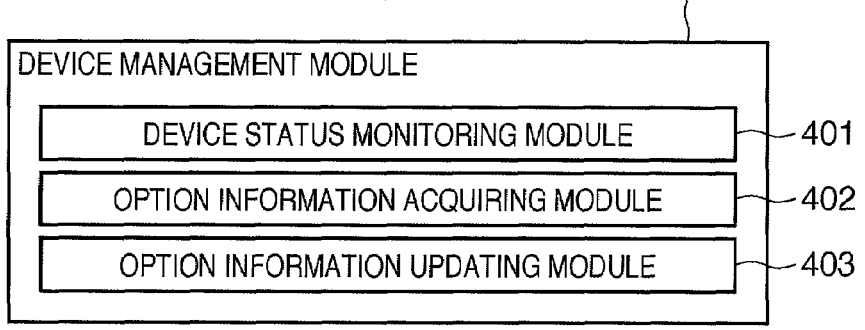
FIG. 4 is a block diagram showing an example of the module configuration of a device management module in the device management server.

FIG. 4 is a block diagram showing in more detail an example of the module configuration of the device management module 302.

The device management module 302 comprises a device status monitoring module 401, option information acquiring module 402, and option information updating module 403. The device status monitoring module 401 monitors the status of a device to be managed, and acquires information for determining an operation to be executed by device management software. The option information acquiring module 402 determines whether an optional unit has been mounted in a device to be managed. Based on option information acquired from the option information acquiring module 402, the option information updating module 403 updates information for managing the option mounting status.

(Example of Module Configuration of Virtual Device Configuration Management Module 303)

Figure 5:
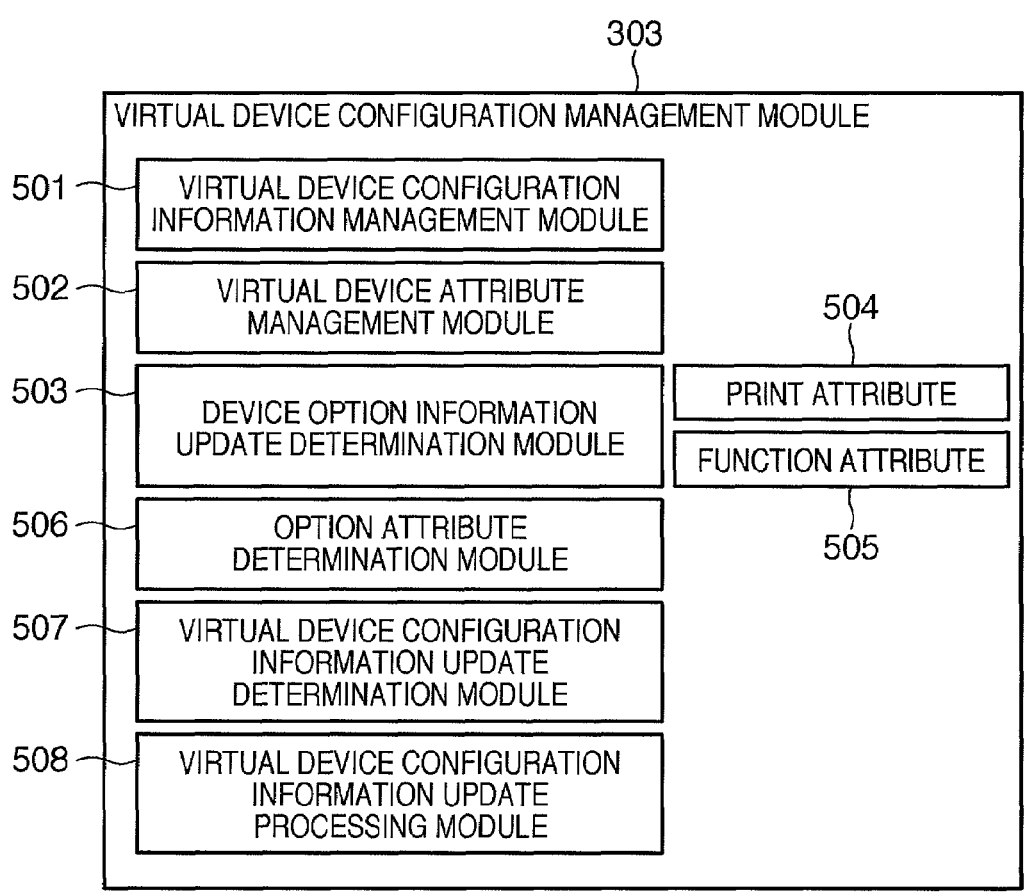
FIG. 5 is a block diagram showing an example of the module configuration of a virtual device configuration management module in the device management server.

FIG. 5 is a block diagram showing in more detail an example of the module configuration of the virtual device configuration management module 303.

A virtual device configuration information management module 501 manages information representing actual devices which construct a virtual device. A virtual device attribute management module 502 manages information representing an attribute output which can be provided by a virtual device. A device option information update determination module 503 determines whether an optional function has been mounted in an actual device which constructs a virtual device. Attribute information 504 and attribute information 505 are respectively classified into a managed print attribute and function attribute.

An option attribute determination module 506 manages correspondence information between optional functions mounted in actual devices which construct a virtual device, and attributes to be enabled. By using enabled optional functions and attribute information, a virtual device configuration information update determination module 507 determines whether or not to update information on actual devices which construct a virtual device. A virtual device update processing module 508 determines whether items of configuration information and the like overlap each other as a result of updating virtual device configuration information, and when it determines to update the virtual device configuration information, updates it.

<Examples of Concept of Virtual Device in Embodiments>

Examples of a concept when a plurality of actual devices are combined and operate as a virtual device in the embodiments will be explained.

Concept Example 1

Figure 6:
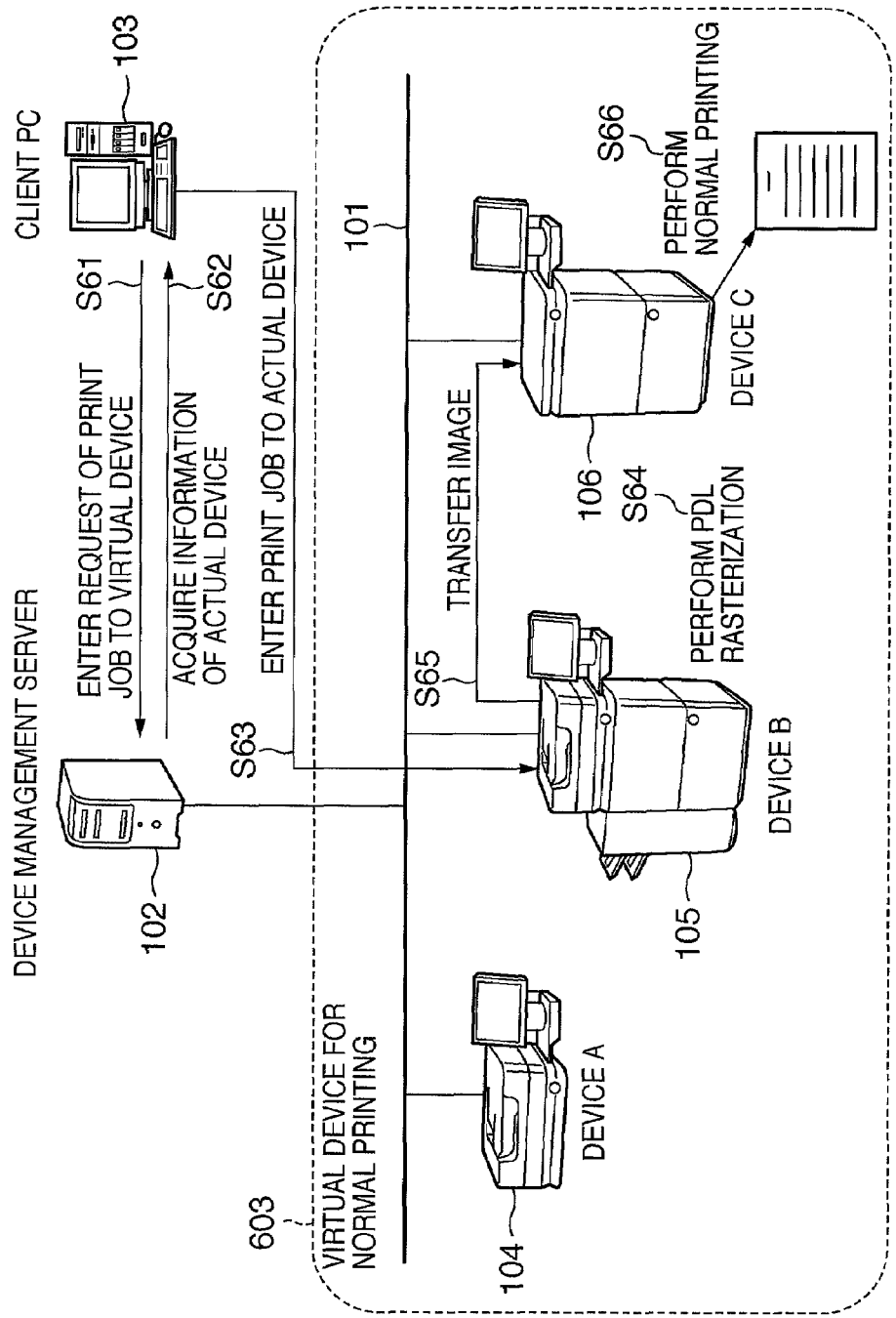
FIG. 6 is a view showing concept example 1 of an operating method using a virtual device.

FIG. 6 is an operating concept view showing concept example 1 when a plurality of actual devices are combined and operate as a virtual device.

In the environment of FIG. 6, a virtual device 603 surrounded by a dotted line is constructed by sharing the functions of plural devices, and functions as one virtual device for the device management server 102 which manages virtual device configuration information and the client PC 103 which performs a print request from an application program.

The virtual device 603 is formed from actual devices, that is, the device A 104 assigned a part of the scan function, the device B 105 which receives entry of a print job from the client PC 103 and is assigned a part of the image rendering function, and the device C 106 which receives a rendered image from the device B and is assigned a part of the normal print output function.

The devices A, B, and C, device management server 102, and client PC 103 are connected via the network medium 101, and execute a print process while exchanging data.

The sequence of a detailed print process by this configuration will be described in order.

(S61) As a preparation process to enter a print job to the virtual device 603, the client PC 103 issues a request of a print job entry to the device management server 102. At this time, the client PC 103 also transmits information including a virtual device name as information for specifying the virtual device 603.

(S62) The client PC 103 acquires, from the device management server 102, information on actual devices which construct the virtual device 603. The client PC 103 determines an actual device to which the print job is to be entered.

(S63) The client PC 103 enters the print job to the device B 105. After the device B receives the print job, it transfers the job in accordance with the function sharing of the virtual device 603.

(S64) In this example, the device B receives the print job, and rasterizes the print job into print image data (PDL rasterization).

(S65) After the rasterization, the device B transmits the print image data to the device C 106. The device C performs normal print output by using the received image. Since print output has been exemplified, the device A 104 does not execute a scan process.

Concept Example 2

Figure 7:
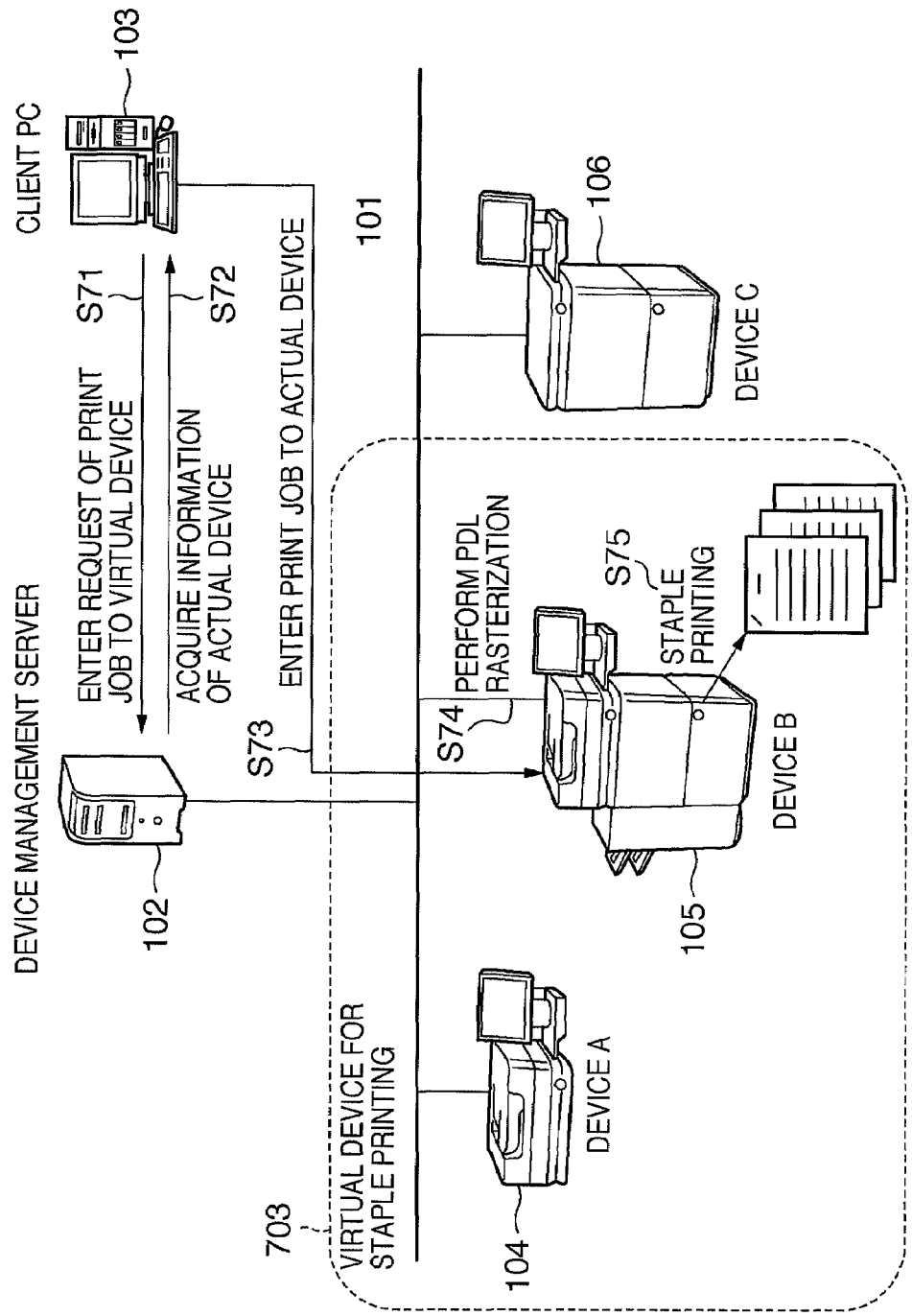
FIG. 7 is a view showing concept example 2 of the operating method using a virtual device.

FIG. 7 is an operating concept view showing concept example 2 when a plurality of actual devices are combined and operate as a virtual device.

In the environment of FIG. 7, a virtual device 703 surrounded by a dotted line is constructed by sharing the functions of plural devices, and functions as one virtual device for the device management server 102 which manages virtual device configuration information and the client PC 103 which performs a print request from an application program.

The virtual device 703 is formed from actual devices, that is, the device A 104 assigned a part of the scan function, and the device B 105 assigned a part of a function of receiving entry of a print job from the client PC and performing output using a finisher.

The devices A, B, and C, device management server 102, and client PC 103 are connected via the network medium 101, and execute a print process while exchanging data.

The sequence of a detailed print process by this configuration will be described in order.

(S71) As a preparation process to enter a print job of a print attribute using a finisher function to the virtual device 703, the client PC 103 issues a request of a print job entry to the device management server 102. At this time, the client PC 103 also transmits information including a virtual device name as information for specifying the virtual device.

(S72) The client PC 103 acquires, from the device management server 102, information on actual devices which construct the virtual device 703. The client PC 103 determines an actual device to which the print job is to be entered.

(S73) The client PC 103 enters the print job to the device B 105. After the device B receives the print job, it transfers the job in accordance with the function sharing of the virtual device.

(S74) In this example, the device B receives the print job, and rasterizes the print job into print image data (PDL rasterization).

(S75) After the rasterization, the device B performs staple print output by using the finisher.

Since print output has been exemplified, the device A does not execute a scan process.

Concept examples 1 and 2 are merely examples of the virtual device and its operation, and a variety of virtual devices and their operations are conceivable.

<Examples of Structures of Items of Information Used in First Embodiment>

(Example of Virtual Device Configuration Management Table in First Embodiment)

FIG. 8 is a table showing an example of a virtual device configuration management table 800.

The virtual device configuration management table 800 is information constructed when a virtual device is defined in a device management server 102. Since the method of setting the configuration of a virtual device is not the gist of the present invention, an operation after defining a virtual device will be described.

Upon completion of defining virtual devices, the virtual device configuration management table 800 is stored in an HDD 210 of the device management server 102 in FIG. 2. If necessary, a virtual device configuration information management module 501 in FIG. 5 which is part of a virtual device configuration management module 303 in FIG. 3A looks up the virtual device configuration management table 800.

The virtual device configuration management table 800 stores virtual device information 801 representing the name of a virtual device. The virtual device configuration management table 800 stores a virtual device group 802 as information on a group which manages virtual devices. The virtual device configuration management table 800 also stores a print output count 803 as a number of pages on which printing has been done using the virtual device. The virtual device configuration management table 800 further stores shared function information 804 on shared functions of actual devices which construct a virtual device.

The virtual device group is identification information used to manage, for example, two virtual devices for one department. For example, in the example of FIG. 6, virtual device 1 performs normal printing, so a device C near a department to which the user belongs in the user environment is defined as a device assigned a part of the print output (Print) function. In the example of FIG. 7, virtual device 2 is used to perform special printing (staple printing or the like) and requires an advanced-function output device, so a device B is set as a device assigned a part of the print output (Print) function.

Virtual device 1 in FIG. 8 corresponds to concept example 1 in FIG. 6, and virtual device 2 corresponds to concept example 2. In the following description, virtual device 1 corresponds to the first virtual device, and virtual device 2 corresponds to the second virtual device.

(Example of Virtual Device Print-Attribute Table in First Embodiment)

FIG. 9 is a table showing an example of a virtual device print-attribute table 900 which manages correspondence information of designatable print attributes in a virtual device.

The virtual device print-attribute table 900 is information constructed when a virtual device is defined in the device management server 102. An operation after defining a virtual device will be described.

Upon completion of defining virtual devices, the virtual device print-attribute table 900 is stored in the HDD 210 of the device management server 102 in FIG. 2. If necessary, a virtual device attribute management module 502 in FIG. 5 which is part of the virtual device configuration management module 303 in FIG. 3A looks up the virtual device print-attribute table 900.

The virtual device print-attribute table 900 stores a virtual device name 901, virtual device group information 902 on a group which manages virtual devices, and print attribute information 903 on designatable print attributes.

(Example of Print Attribute Management Table which Manages Options and Print Attributes in First Embodiment)

Figure 10:
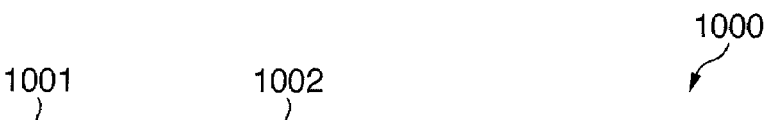
FIG. 10 is a table showing an example of a correspondence table of options and compatible print attributes in the first embodiment.

FIG. 10 shows a print attribute management table 1000 which manages information on options and compatible print attributes.

The print attribute management table 1000 is stored in the HDD 210 of the device management server 102 in FIG. 2. If necessary, an option attribute determination module 506 in FIG. 5 which is part of the virtual device configuration management module 303 in FIG. 3A looks up the print attribute management table 1000.

The print attribute management table 1000 which manages information on options and compatible print attributes may also be stored in the HDD 210 when installing print management software, or allow adding options and attributes later. As an example of the correspondence between the option and the attribute, the correspondence between an option type 1001 and a print attribute 1002 concerning the finisher is exemplified.

For example, the print attribute management table 1000 stores double-sided printing, sort printing, staple-sort printing, bookbinding printing, and Z-folding printing as print attributes in correspondence with a double-sided unit, stacker, finisher, saddle finisher, and paper folding unit as option types.

In addition to these tables, information for managing a virtual device is held. This information will be described along with the following description of process procedures.

<Example of Process Procedures when Changing Mounted Option in First Embodiment>

An example of process procedures when an option is mounted in a device to be managed will be explained. In this case, an option information acquiring module 402 in FIG. 4 which is part of a device management module 302 in FIG. 3A detects the mounting of the option. As a result of the detection, an option information updating module 403 in FIG. 4 updates option mounted information for each actual device.

Figure 12:
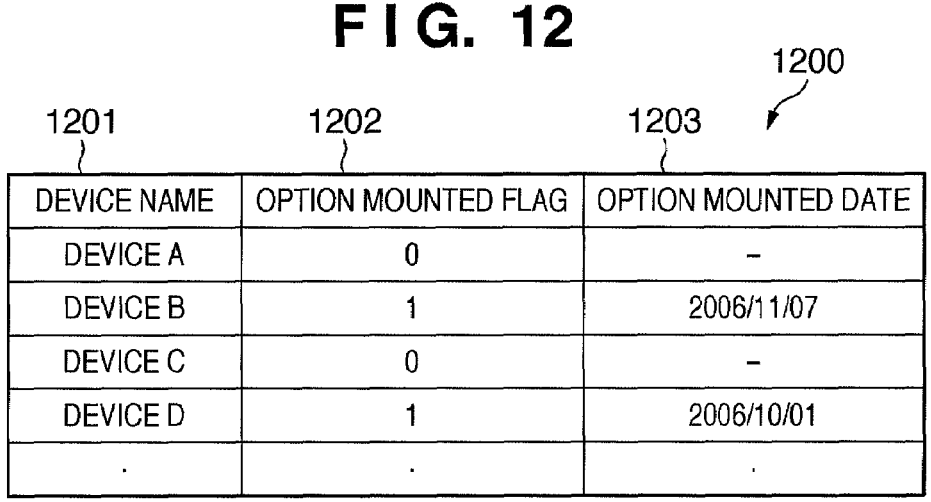
FIG. 12 is a table showing an example of a table which manages a target device and option mounted states in the first embodiment.

FIG. 12 shows an example of a mounted option management table which manages an option mounted state. A mounted option management table 1200 manages, in correspondence with an actual device name 1201, an option mounted flag 1202 representing whether an option is mounted, and an option mounted date 1203 when an option is mounted.

Figure 13:
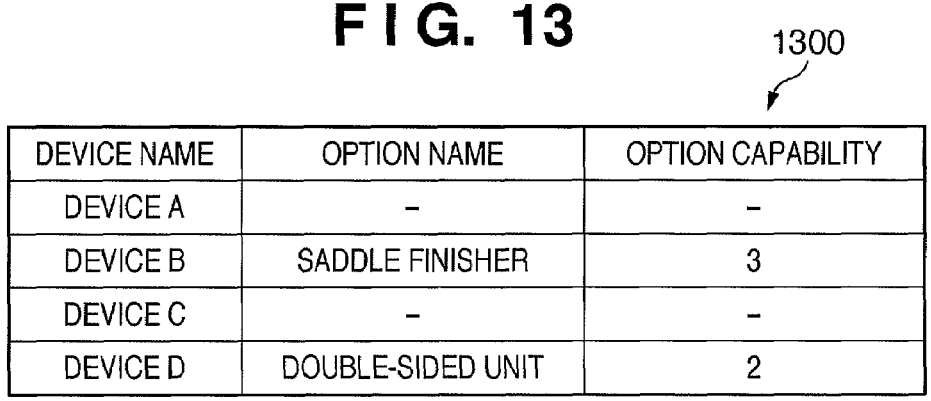
FIG. 13 is a table showing an example of a table which manages a target device and option mounted state before mounting an option in the first embodiment.
Figure 14:
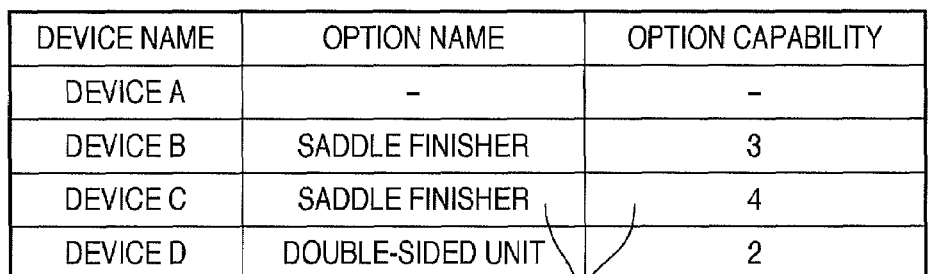
FIG. 14 is a table showing an example of a table which manages a target device and option mounted state after mounting an option in the first embodiment.

FIG. 13 shows an example of option mounted information 1300 representing the correspondence between a target device and a mounted option (option name and option capability) before mounting an option. FIG. 14 shows an example of option mounted information 1400 representing the correspondence between a target device and a mounted option after mounting a new option. In this example, as is apparent from FIGS. 13 and 14, a saddle finisher 1401 having option capability 4 (higher than other option capabilities) is newly mounted in the device C.

Figure 11A:
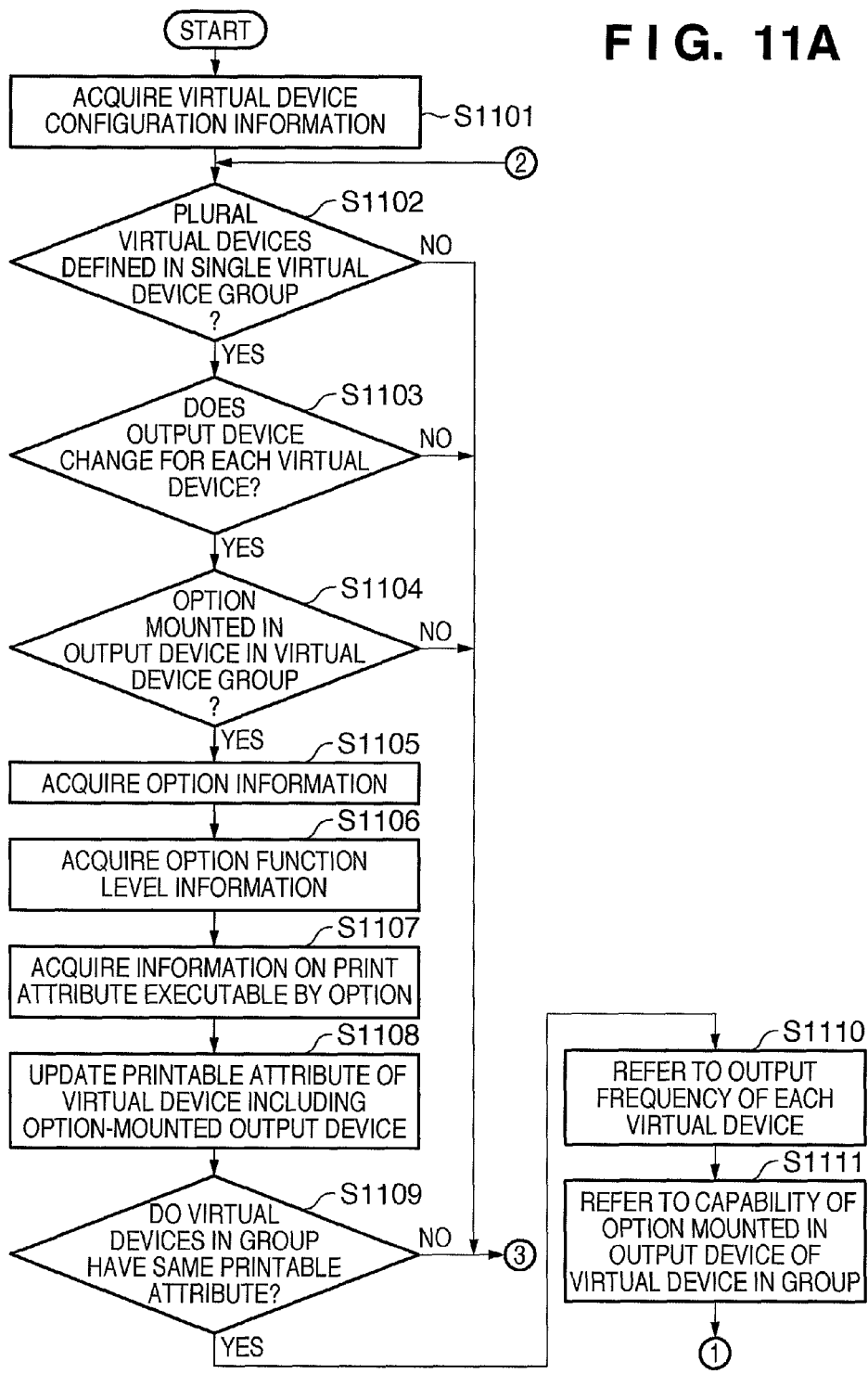
FIGS. 11A and 11B are flowcharts showing examples of a process sequence in the first embodiment.
Figure 11B:
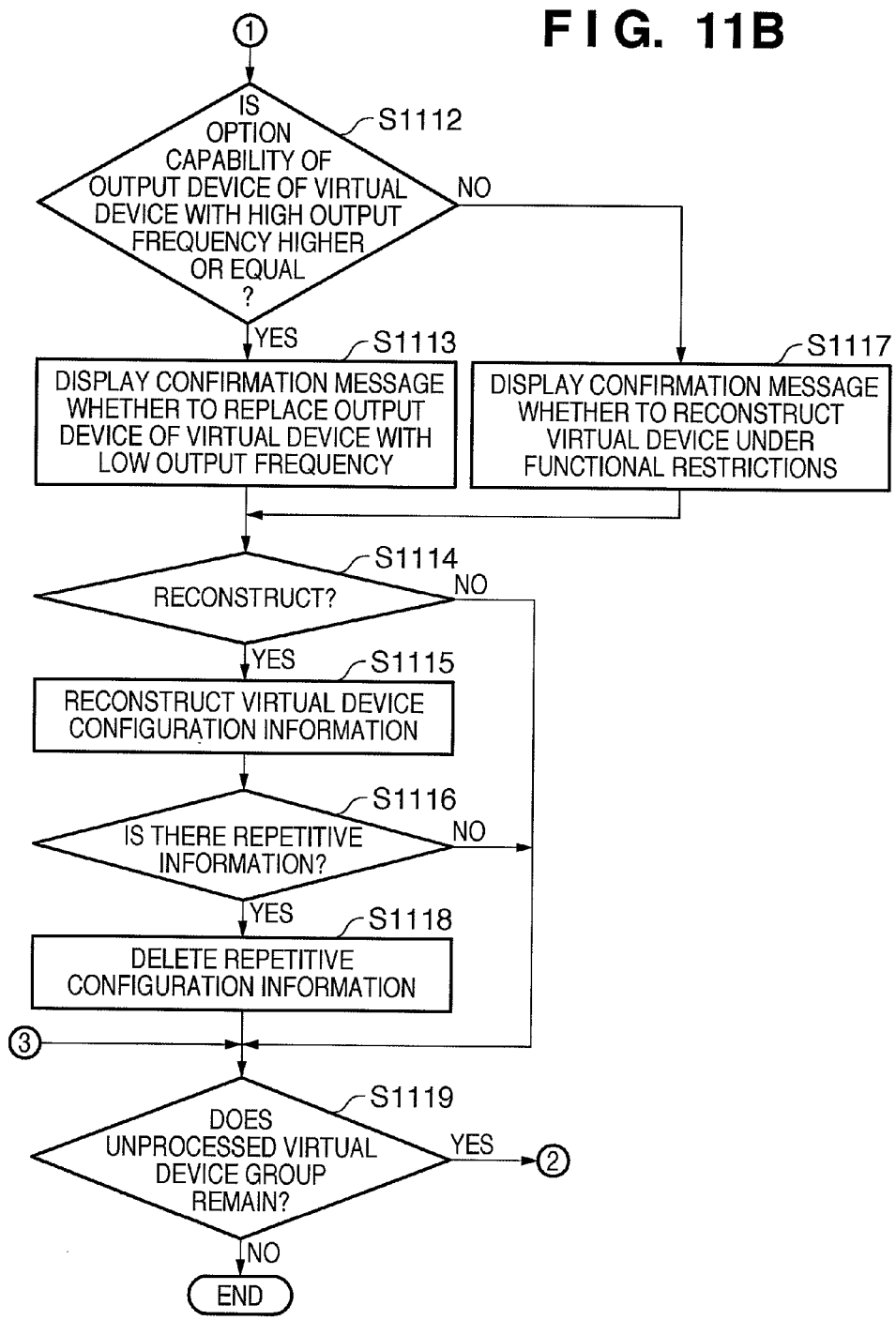

FIGS. 11A and 11B are flowcharts showing examples of process procedures in the first embodiment after updating option mounted information for each actual device. A CPU board 203 of the device management server 102 executes this process.

In step S1101, virtual device configuration information as represented by the virtual device configuration management table 800 in FIG. 8 is acquired from the HDD 210 in the device management server 102.

In step S1102, whether a plurality of virtual devices are defined in a single group is determined by referring to the virtual device group information 802 in the virtual device configuration management table 800 acquired in step S1101. If it is determined that a plurality of virtual devices are defined in a single group, the process advances to step S1103. If it is determined that only one virtual device is defined in the group, the process advances to step S1119. In the example of FIG. 8, a plurality of virtual devices are defined, so the process advances to step S1103.

In step S1103, whether a part of the output function is assigned to different actual devices is determined by referring to information on actual devices which make up virtual devices in the single virtual device group. If it is determined that a part of the output function is assigned to different actual devices for the virtual devices in the single group, the process advances to step S1104. If it is determined that a part of the output function is assigned to a single actual device, the process advances to step S1119. Since a part of the print function is assigned to different actual devices, that is, the device C for virtual device 1 and the device B for virtual device 2 in the example of FIG. 8, the process advances to step S1104.

In step S1104, whether an option has newly been mounted in the actual device assigned a part of the output function of a virtual device is determined by referring to data in the mounted option management table 1200 for each device shown in FIG. 12. If it is determined that an option has newly been mounted, the process advances to step S1105. If it is determined that no option has newly been mounted, the process advances to step S1119. In this example, since an option has newly been mounted in the device C, as shown in FIG. 14, the process advances to step S1105.

In step S1105, information on the newly mounted option is acquired. The type of acquired information is arbitrary, such as the name or ID of an option, as long as the information can specify a mounted option. As a method of acquiring option information, information is acquired from Management Information Base (MIB) using general Simple Network Management Protocol (SNMP) or acquired using a unique device management protocol. In this example (see FIG. 14), information representing that the option newly mounted in the device C is a saddle finisher is acquired.

In step S1106, information on the function level of the newly mounted option is acquired. As a method of acquiring function level, information is generally acquired for an option from MIB using general SNMP or acquired using a unique device management protocol. However, information can also be acquired by inquiring it of an external option information management server. In this example (see FIG. 14), information representing that the mounted saddle finisher has option capability 4 is acquired.

In step S1107, the print attribute management table 1000 serving as a correspondence table shown in FIG. 10 between options and designatable print attributes is looked up for the newly mounted option and compatible print attributes, thereby determining print attributes which become enabled upon mounting the option.

In step S1108, the print attributes which become enabled in accordance with the option and have been determined in step S1107 are reflected in the virtual device print-attribute table 900 of FIG. 9. In this example, the saddle finisher has been mounted in the device C assigned a part of the print function of virtual device 1. Thus, the print attributes of sort, staple-sort, and bookbinding printing become enabled for virtual device 1 in FIG. 9. This will be described in detail later.

In step S1109, whether virtual devices having the same coincident printable attributes exist in a single virtual device group is determined by referring to the contents of the virtual device print-attribute table 900 in FIG. 9 on the basis of a comparison with the print attributes of the virtual device that have been updated in step S1108. If it is determined that virtual devices having the same printable attributes exist, the process advances to step S1110. If it is determined that no virtual devices having the same printable attributes exist, the process advances to step S1119. In this example, since in step S1108, virtual device 1 in FIG. 9 is added as print attribute, sort, stable-sort and bookbinding printing, virtual devices 1 and 2 have the same print attributes, and the process advances to step S1110.

In step S1110, output frequency information as the use frequency representing which virtual device is more frequently used to print when virtual devices having the same printable attribute exist is acquired by referring to the print count 803 of the virtual device configuration management table 800 in FIG. 8. After acquiring the output frequency information, the process advances to step S1111.

In step S1111, information on an option mounted in a device assigned a part of the print output function in a single virtual device group is referred to by looking up the virtual device configuration management table 800 in FIG. 8. More specifically, information on options mounted in the devices C and B assigned a part of the Print function in virtual devices 1 and 2 belonging to Group 1 is acquired. That is, option information on the saddle finisher mounted in device C is acquired and the option mounted information 1300 in FIG. 13 is changed to the option mounted information 1400 in FIG. 14.

In step S1112, whether the option capability of a more frequently used virtual device is equal or higher is determined by referring to the option capability acquired in step S1111 and output frequency information acquired in step S1110 as the use frequency. If it is determined that the option capability of a more frequently used virtual device is higher or equal, the process advances to step S1113. To the contrary, if it is determined that the option capability of a more frequently used virtual device is lower, the process advances to step S1117. In this example, the saddle finisher as an option mounted in the device C assigned a part of the output function of virtual device 1 has option capability 4, and the saddle finisher as an option mounted in the device B assigned a part of the output function of the virtual device 2 has option capability 3. For this reason, it is determined that the option capability of more frequently used virtual device 1 is higher, and the process advances to step S1113.

Figure 15:
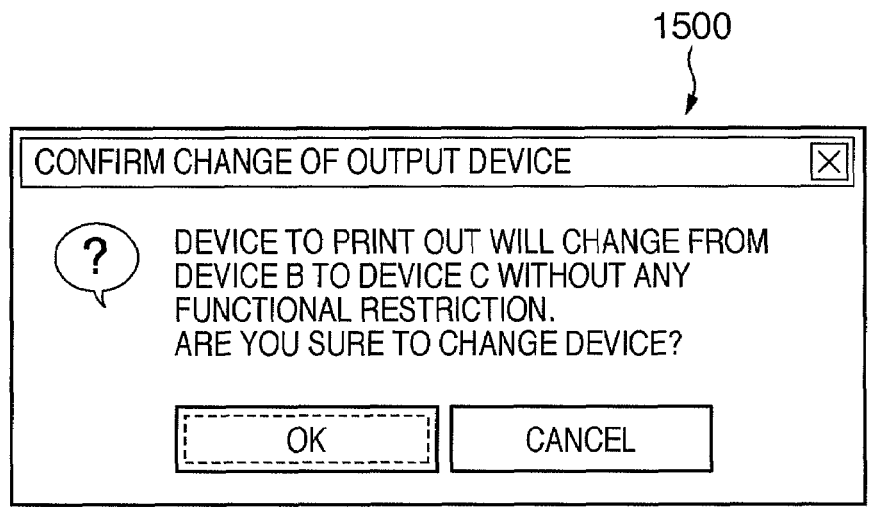
FIG. 15 is a view showing an example of a confirmation message when replacing a device without any functional restriction in the first embodiment.
Figure 16:
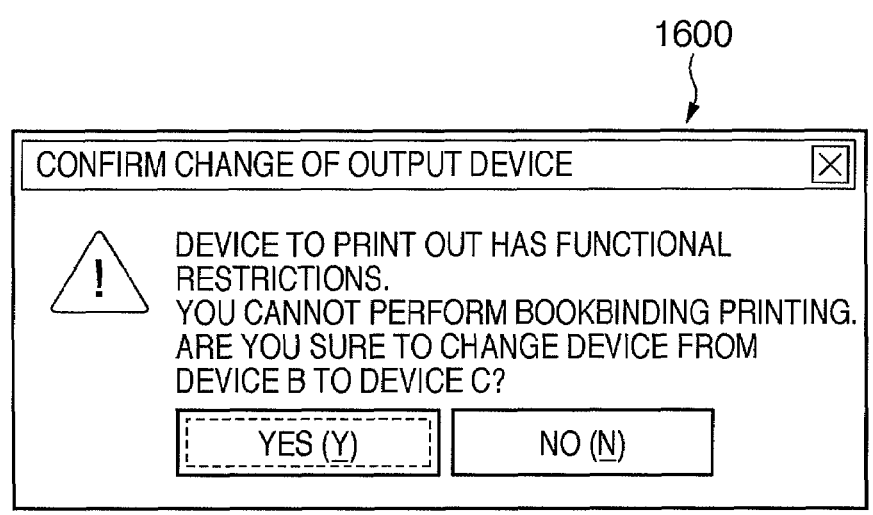
FIG. 16 is a view showing an example of a confirmation message when replacing a device under functional restrictions in the first embodiment.

In step S1113, a message 1500 as shown in FIG. 15 is displayed to confirm that a device for outputting a print result will be changed, and prompts the administrator, who manages virtual devices, to make a determination. In step S1117, since the device for outputting a print result can be changed to a frequently used device though it has functional restrictions, it is confirmed whether or not to change the device to a frequently used one. More specifically, a message 1600 as shown in FIG. 16 is displayed to prompt the administrator, who manages virtual devices, to make a determination.

In step S1114, information on the determinations made by the administrator, who manages virtual devices, in response to the messages displayed in steps S1113 and S1117 is acquired to determine whether to reconstruct (OK) the configuration information of virtual devices or cancel the reconstruction. If it is determined to reconstruct the configuration information of virtual devices, the process advances to step S1115. If it is determined to cancel the reconfiguration, the process advances to step S1119.

If it is determined to finally change the configuration of virtual devices because the option has been mounted in a device assigned a part of the print function of a virtual device, the virtual device configuration information is changed in step S1115. In this example, in the virtual device configuration management table 800 of FIG. 8, the device C replaces the device B assigned a part of the Print function of virtual device 2. FIG. 17 shows an example of a virtual device configuration management table 800' after reconstruction. The same reference numerals as those in FIG. 8 denote the same parts.

In step S1116, information on actual devices which make up a virtual device in the virtual device configuration management table 800' obtained by changing the configuration in step S1115 is checked. If there are configurations in which virtual devices are formed from the same devices and overlap each other, the process advance to step S1118. If there is no information representing overlapping of virtual devices, the process advances to step S1119. As a concrete example using FIG. 17, information on actual devices which make up virtual devices 1 and 2 in Group 1 is referred to. In this example, virtual devices 1 and 2 use the same actual devices and overlap each other, so the process advances to step S1118.

Figure 18:
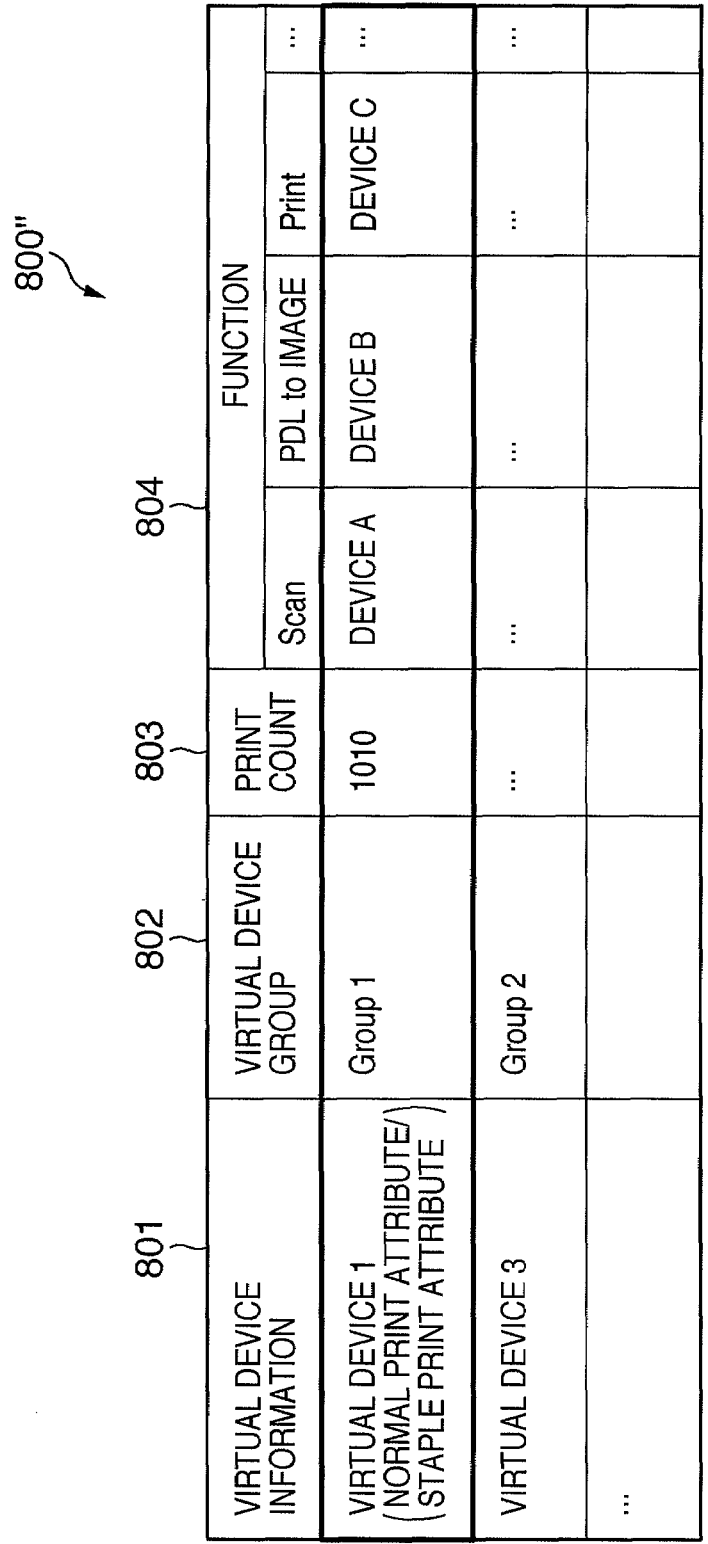
FIG. 18 is a table showing an example of a virtual device configuration management table after deleting a repetitive configuration in the first embodiment.

In step S1118, the repetitive virtual device configuration information is deleted. FIG. 18 shows an example of a virtual device configuration management table 800" after the deletion. The same reference numerals as those in FIG. 8 denote the same parts. The user (administrator) can also register and manage a device name and application purpose for each virtual device. It is, therefore, possible to integrate items of registered device information of two virtual devices without deleting device information, and manage the integrated device information for one virtual device. This step can integrate virtual devices having the same actual device configuration into one regardless of whether repetitive virtual devices are deleted or integrated.

In step S1119, it is determined whether there is a virtual device group which has not undergone the above-described process. If an unprocessed virtual device group remains, the process returns to step S1102 to repeat the above-described process. If no unprocessed virtual device group remains, the process ends.

An option mounted in a printing apparatus has been exemplified, but the target option is not limited to a mounted one. For example, the first embodiment is also applicable to an operation to activate a function installed in advance when shipping a printing apparatus. The first embodiment is also applicable to a case where a function is activated by providing external equipment such as a network. Examples of such a function are a FAX function, a SEND function of sending e-mail, and a BOX function of storing/extracting data inside and outside a device in/from the storage of the device.

The above-described process can activate an optional function for a printing apparatus, as described in the first embodiment. When the virtual device configuration is changed while referring to information of the optional function, the output form can be unified. At the same time, repetitive virtual device configuration information can be thrown into one.

The first embodiment has described a case where a frequently used virtual device is changed to have an advanced function. When the function becomes equal to or superior to that of another virtual device, virtual devices may also be reconstructed without inquiring it of the user in step S1113 or S1117.

The first embodiment has exemplified a virtual device system in which a printing apparatus is a device. However, the device to which the technical idea of the present invention is applied is not limited to a printing apparatus, and also includes a single-function apparatus such as a scanner.

<Example of Process when Changing Option Resource in Second Embodiment>

A case where the present invention is applied to resource data such as the font of a printing apparatus or the format of a form will be described.

An external management application can download resource data (e.g., fonts, external characters, the format of a form, or a color profile used for a color process) necessary for printing into a printing apparatus. Depending on whether the downloaded resource exists, some print materials can be output, and some print materials cannot. For example, in form printing of overlaying form data registered in a print device, the output result of printing by a device having no format of a form is useless.

Similarly, when printing documents containing text expressed in a foreign character set and relying on the target printer to have that foreign character registered, if the print device does not include support for the foreign character set, the text expressed in that character set is not output or is substituted with other text, providing the user with undesirable output results.

(Downloading of Print Resource)

An outline of a process when downloading a print resource to an output device in an external print device management system will be briefly explained as a precondition.

A program for downloading a print resource may also be implemented as one function of a device management server 102 or independent utility software which runs on a client PC 103. It suffices that the program can download selected resource data to a destination device.

The download program is installed in an HDD 210 when it is executed by the device management server 102, and an HDD 249 when it is executed by the client PC 103. The program is activated in accordance with an instruction from the device administrator, as needed.

Print resource data to be downloaded to an output device is selected using a user interface. One or a plurality of resource data can be selected, and the type of resource data is not limited. The print resource data download program converts the print resource data into a format interpretable by a print output device. The download data of the resource data is transmitted using a download instruction command and download command according to conventions with the print device.

Upon receiving the download data, the print output device interprets the received data. The print output device stores the received resource data in an HDD 218 or HDD 229 serving as an internal storage area of the device. When the print output device receives a print process request later, it can read out and use the data, as needed, and reflect it in a print result. Note that the storage area of the print device is not limited to the HDD, and the type of storage medium is arbitrary as long as the storage medium is a nonvolatile memory such as a flash ROM. Resource data which becomes sufficiently available only when the device is turned on can also be downloaded to a nonvolatile memory.

<Examples of Structures of Items of Information Used in Second Embodiment>

(Example of Print Function Attribute Table which Manages Option Resource and Print Attribute in Second Embodiment)

FIG. 19 shows an example of a print function attribute table 1900 representing an example of the correspondence between a print resource downloadable to a print device and a print function attribute.

In the example of FIG. 19, the print function attribute table 1900 stores information that, when a format 1901 of a form is downloaded to a print device, output from a workflow 1902 for the form is possible as a print function attribute.

The format of a form will be exemplified. When the download resource provides font data, information on the font name and a document which selects this font can be printed. When the download resource provides external characters, a document using the external character data can be printed.

(Example of Virtual Device Configuration Management Table in Second Embodiment)

FIG. 20 shows a virtual device configuration management table 2000 in the second embodiment.

In FIG. 20, virtual devices 1 and 2 belong to a single group. Virtual device 1 is constructed from devices A, B, and C, and used to print with the normal print attribute. Virtual device 2 is constructed from the devices A and B, and used to print with the form print attribute.

Upon completion of defining virtual devices, the virtual device configuration management table 2000 is stored in the HDD 210 of the device management server 102 in FIG. 2. If necessary, a virtual device configuration information management module 501 in FIG. 5 which is part of a virtual device configuration management module 303 in FIG. 3A looks up the virtual device configuration management table 2000.

The virtual device configuration management table 2000 stores virtual device information 2001 representing the name of a virtual device. The virtual device configuration management table 2000 stores a virtual device group 2002 as information on a group which manages virtual devices. The virtual device configuration management table 2000 also stores a print output count 2003 as a number of pages on which printing has been done using the virtual device. The virtual device configuration management table 2000 further stores shared function information 2004 on shared functions of actual devices which make up a virtual device.

(Example of Virtual Device Print-Attribute Table in Second Embodiment)

FIG. 21 is a table showing an example of a virtual device print-attribute table 2100 which manages designatable print attributes in virtual devices 1 and 2.

In this example, virtual devices 1 and 2 have the same print attributes except the form print attribute.

Upon completion of defining virtual devices, the virtual device print-attribute table 2100 is stored in the HDD 210 of the device management server 102 in FIG. 2. If necessary, a virtual device attribute management module 502 in FIG. 5 which is part of the virtual device configuration management module 303 in FIG. 3A looks up the virtual device print-attribute table 2100.

The virtual device print-attribute table 2100 stores a virtual device name 2101 of a virtual device, virtual device group information 2102 on a group which manages virtual devices, and print attribute information 2103 on designatable print attributes.

<Example of Process Procedures in Second Embodiment>

Figure 22A:
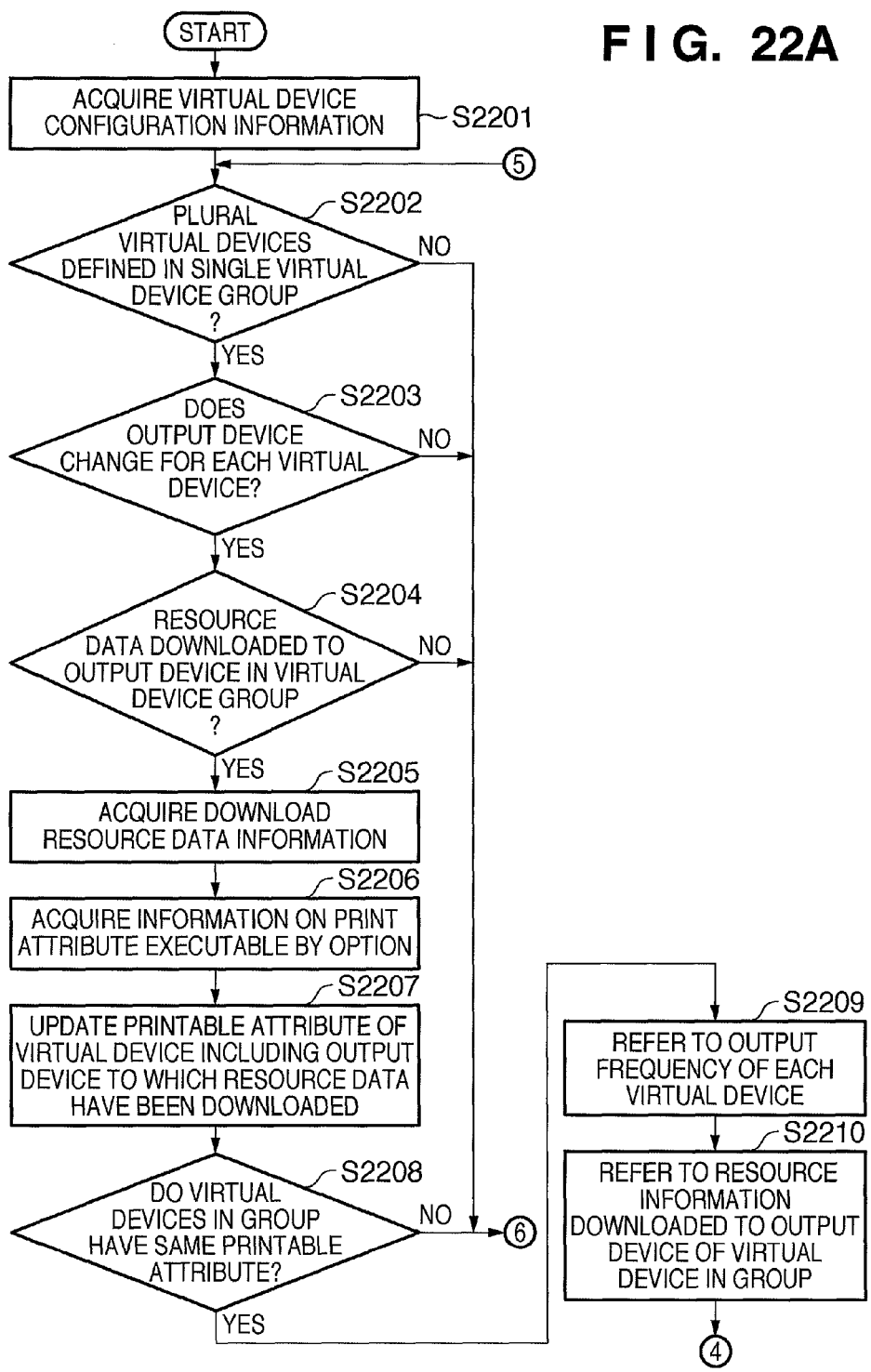
FIGS. 22A and 22B are flowcharts showing examples of a process sequence in the second embodiment.
Figure 22B:
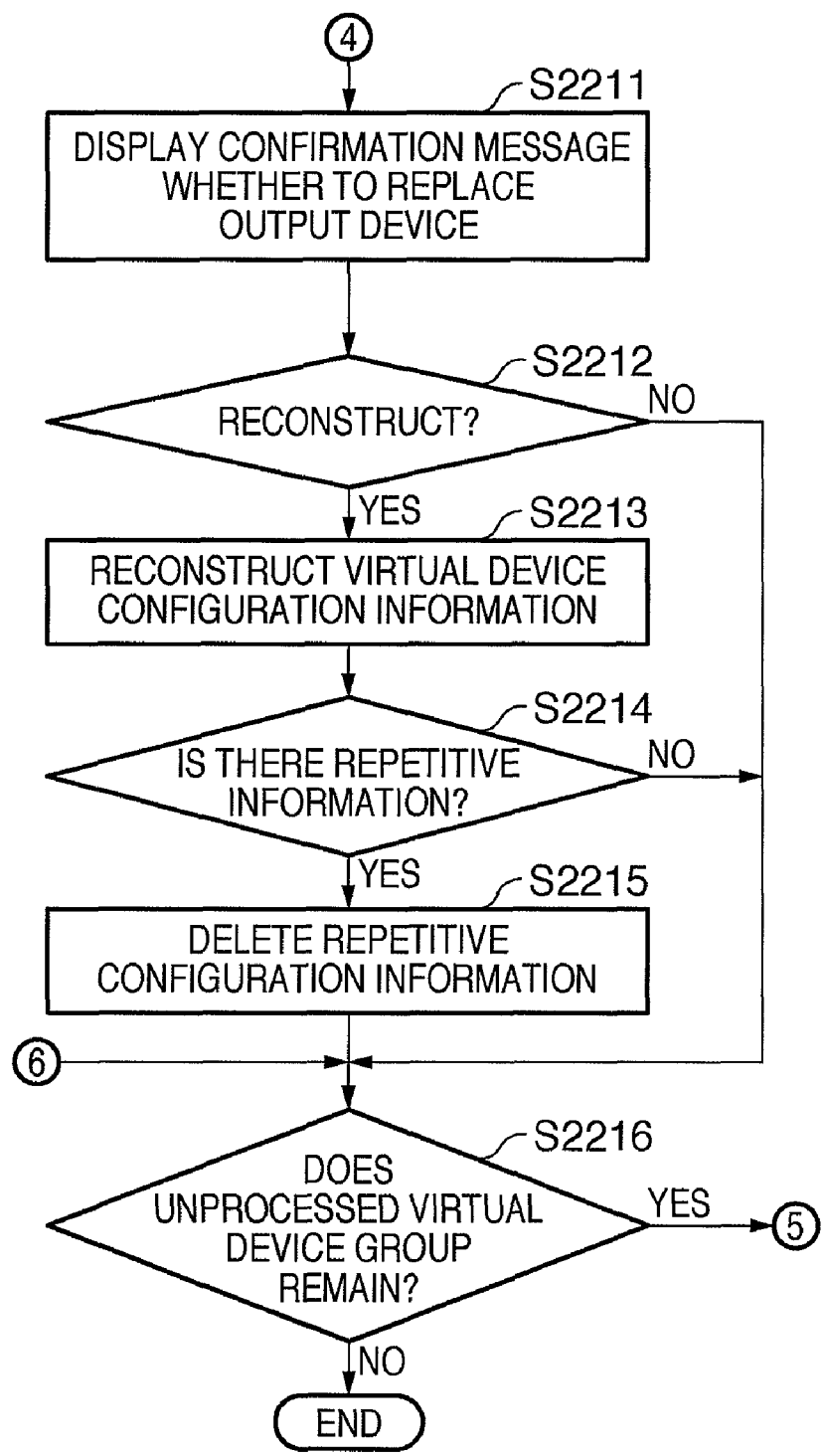
Figures 23, 24, 25:
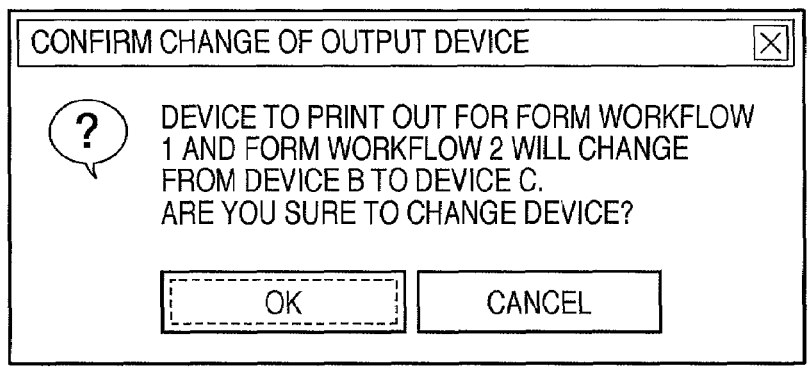
FIG. 23 is a table showing an example of a table which manages the correspondence between devices and download resource information before downloading resource data in the second embodiment.
FIG. 24 is a table showing an example of a table which manages the correspondence between devices and download resource information after downloading resource data in the second embodiment.
FIG. 25 is a view showing an example of a confirmation message when changing the virtual device configuration in the second embodiment.

FIGS. 22A and 22B are flowcharts showing examples of process procedures in the second embodiment. A CPU board 203 of the device management server 102 controls this process. As a change of the resource in this example, FIG. 23 shows an example of resource data information 2300 representing the correspondence between a target device and a mounted option before downloading resource data. FIG. 24 shows an example of resource data information 2400 representing the correspondence between a target device and a mounted option after downloading resource data. In this example, formats 1 and 2 of a form are newly downloaded to a device C.

In step S2201, virtual device configuration information as shown in FIG. 20 is acquired from the HDD 210 in the device management server 102.

In step S2202, whether a plurality of virtual devices are defined in a single group is determined by referring to the virtual device group information 2002 in the virtual device configuration management table 2000 acquired in step S2201. If it is determined that a plurality of virtual devices are defined in a single group, the process advances to step S2203. If it is determined that only one virtual device is defined in the group, the process advances to step S2216. In this example, a plurality of virtual devices are defined, so the process advances to step S2203.

In step S2203, whether a part of the output function is assigned to different actual devices is determined by referring to information on actual devices which make up virtual devices in the single virtual device group. If it is determined that a part of the output function is assigned to different actual devices for the virtual devices in the single group, the process advances to step S2204. If it is determined that a part of the output function is assigned to a single actual device, the process advances to step S2216. Since a part of the output function is assigned to the device C for virtual device 1 and the device B for virtual device 2 in the example of FIG. 8 (see FIG. 20), the process advances to step S2204.

In step S2204, it is determined whether resource data has newly been downloaded to the actual device assigned a part of the output function of a virtual device. If it is determined that resource data has newly been downloaded, the process advances to step S2205. If it is determined that no resource data has newly been downloaded, the process advances to step S2216. In this example, since formats 1 and 2 of a form have newly been downloaded to the device C, as shown in FIG. 24, the process advances to step S2205.

In step S2205, information on the newly downloaded resource data is acquired. For the format of a form, information for specifying form data, such as information on the form name and the subtitle of the form, is acquired. In this example, information representing formats 1 and 2 of a form is acquired in FIG. 24.

When the resource data is font data, a font name for specifying the font is acquired. When the resource data is a color profile, a profile name for specifying the profile, and information on a color space are acquired. Since the method of acquiring resource data information is not the gist of the present invention, information is acquired from MIB using general SNMP or acquired using a unique device management protocol.

In step S2206, print attributes compatible with the newly downloaded resource data are determined by looking up the print function attribute table 1900 serving as a correspondence table shown in FIG. 19 between option resources and designatable print attributes. In this example, form print workflows 1 and 2 are determined as print attributes.

In step S2207, the print attributes which become enabled in accordance with the downloaded resource data and have been determined in step S2206 are reflected in the virtual device print-attribute table 2100 of FIG. 21. In this example, form printing 1 and form printing 2 by virtual device become enabled.

In step S2208, the contents of the virtual device print-attribute table 2100 in FIG. 21 that have been updated in step S2207 are compared to determine whether virtual devices having the same coincident printable attributes exist in a single virtual device group. If it is determined that virtual devices having the same printable attributes exist, the process advances to step S2209. If it is determined that no virtual devices having the same printable attributes exist, the process advances to step S2216. In this example, virtual devices 1 and 2 have the same printable attributes, and the process advances to step S2209.

In step S2209, output frequency information representing which virtual device is more frequently used to print is acquired by referring to the print count 2003 of the virtual device configuration management table 2000 in FIG. 20. After acquiring the output frequency information, the process advances to step S2210.

In step S2210, the resource data downloaded to a device assigned a part of the print output function in a single virtual device group is referred to in the virtual device configuration management table 2000 of FIG. 20. More specifically, information on resource data downloaded to the devices C and B assigned a part of the Print function in virtual devices 1 and 2 belonging to Group 1 is acquired.

In step S2211, a message 2500 as shown in FIG. 25 is displayed to confirm that a device for outputting a print result will be changed, and prompts the administrator, who manages virtual devices, to make a determination.

In step S2212, information on the determination made by the administrator, who manages virtual devices, in response to the message 2500 displayed in step S2211 is acquired to determine whether to reconstruct (OK) virtual devices or cancel the reconstruction. If it is determined to finally change the configuration of virtual devices because the resource data has been downloaded to a device assigned a part of the print function of an actual device which is part of a virtual device, the process advances to step S2213. If it is determined to cancel the reconstruction, the process advances to step S2216.

Figure 26:
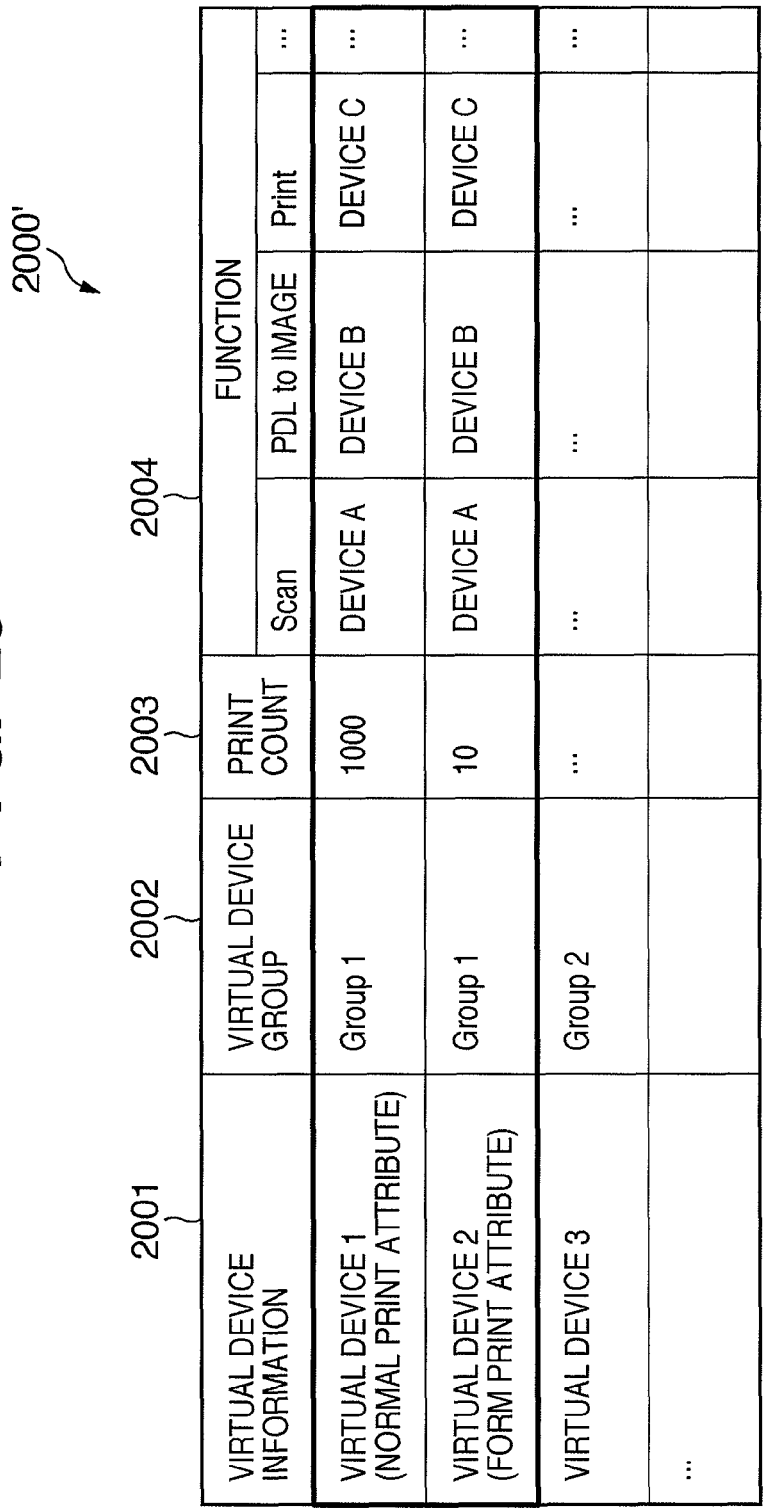
FIG. 26 is a table showing an example after changing virtual device configuration information in the second embodiment.

In step S2213, virtual device configuration information is changed. More specifically, the device C replaces the device B assigned as part of the Print function of virtual device 2 in the virtual device configuration management table of FIG. 20. FIG. 26 shows an example of a virtual device configuration management table 2000' after reconstruction. In FIG. 26, the same reference numerals as those in FIG. 20 denote the same parts.

In step S2214, information on actual devices which make up a virtual device in the virtual device configuration management table 2000' obtained by changing the configuration in step S2213 is checked. If there are configurations in which virtual devices are formed from the same devices and overlap each other, the process advances to step S2215. If there is no information representing overlapping of virtual devices, the process advances to step S2216. As a concrete example using FIG. 26, actual devices which construct virtual devices 1 and 2 in Group 1 have the same information, and the virtual devices overlap each other. Thus, the process advances to step S2215.

In step S2215, the repetitive virtual device configuration information is deleted. FIG. 27 shows an example of a virtual device configuration management table 2000" after the deletion. In FIG. 27, the same reference numerals as those in FIG. 20 denote the same parts.

In step S2216, it is determined whether there is a virtual device group which has not undergone the above-described process. If an unprocessed virtual device group remains, the process returns to step S2202 to repeat the above-described process. If no unprocessed virtual device group remains, the process ends.

The above-described process can download resource data to a printing apparatus, as described in the second embodiment. When the virtual device configuration is changed while referring to the contents of the resource data, the output form can be unified. At the same time, repetitive virtual device configuration information can be deleted.

The second embodiment has exemplified a virtual device system in which a printing apparatus is a device. However, the device to which the technical idea of the present invention is applied is not limited to a printing apparatus.

The present invention may be applied to a system or integrated apparatus including a plurality of devices (e.g., a host computer, interface device, and printer) or an apparatus formed by a single device.

The object of the present invention is also achieved by supplying a storage medium (or recording medium) which stores software program codes for implementing the functions of the above-described embodiments to a system or apparatus, and reading out and executing the program codes stored in the storage medium by the computer (or the CPU or MPU) of the system or apparatus. In this case, the program codes read out from the storage medium implement the functions of the above-described embodiments, and the storage medium which stores the program codes constitutes the present invention. The functions of the above-described embodiments are implemented when the computer executes the readout program codes. In addition, the present invention includes a case where an OS (Operating System) or the like running on the computer performs some or all of actual processes on the basis of the instructions of the program codes and thereby implements the functions of the above-described embodiments.

Further, the present invention includes the following case. That is, the program codes read out from the storage medium are written in the memory of a function expansion card inserted into the computer or the memory of a function expansion unit connected to the computer. Then, the CPU of the function expansion card or function expansion unit performs some or all of actual processes on the basis of the instructions of the program codes, thereby implementing the functions of the above-described embodiments.

When the present invention is applied to the storage medium, the storage medium stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-260355, filed Oct. 3, 2007, which is hereby incorporated by reference herein in its entirety.

What is claimed is:

1. A management apparatus for managing a plurality of actual devices and virtual devices, each virtual device providing an operation constructed by combining functions of the plurality of actual devices, comprising:
   a detection unit adapted to detect a change of an optional function of an actual device;
   a change unit adapted to change, in correspondence with the change of the optional function detected by said detection unit, an attribute of a first virtual device including an actual device of which the optional function has been changed;
   a determination unit adapted to determine a second virtual device which has the same attribute as the attribute of the first virtual device that has been changed by said change unit;
   a reconfiguration unit adapted to, in the case that said determination unit determines a second virtual device having the same attribute, change the configuration of the second virtual device so as to use the actual device of which the change of the optional function has been detected by said detection unit;
   a comparison unit adapted to compare respective actual devices constituting the virtual devices after said reconfiguration unit changes the configuration of the second virtual device; and
   a management unit adapted to manage virtual devices found in the comparison by the comparison unit to have the same actual devices by regarding such virtual devices as one virtual device.

2. The apparatus according to claim 1, further comprising an inquiry unit adapted to, when said determination unit determines the second virtual device having the same attribute, inquire of a user whether or not to change the configuration of the second virtual device so as to use the actual device of which the change of the optional function has been detected by said detection unit,
   wherein said reconfiguration unit changes, in accordance with a user instruction in response to the inquiry from said inquiry unit, the configuration of the second virtual device so as to use the actual device of which the change of the optional function has been detected by said detection unit.

3. The apparatus according to claim 2, wherein, in the case that functions to be provided by the second virtual device are restricted upon said changing of the configuration of the second virtual device, said inquiry unit inquires of the user together with contents representing that the functions are restricted, whether or not to change the configuration of the second virtual device so as to use the actual device of which the change of the optional function has been detected by said detection unit.

4. The apparatus according to claim 1, wherein
   the optional function of the actual devices includes functions of optional units mounted in the actual devices, and
   said detection unit detects a change of an optional function by detecting mounting of an optional unit in an actual device.

5. The apparatus according to claim 4, wherein
   the optional unit includes a double-sided unit, a stacker, a finisher, a saddle finisher, and a paper folding unit, and
   the attribute includes double-sided printing, sort printing, staple-sort printing, bookbinding printing, and Z-folding printing.

6. The apparatus according to claim 1, wherein
   the optional function of the actual devices includes functions implemented by optional data and/or an optional program downloaded to the actual devices, and
   said detection unit detects a change of an optional function by detecting downloading of the optional data and/or the optional program.

7. The apparatus according to claim 6, wherein
   the optional data and/or the optional program includes a format of a form, font data, and external character data, and
   the attribute is a workflow for form printing when the optional data is the format of the form.

8. The apparatus according to claim 1, wherein said detection unit detects a change of an optional function by detecting whether or not the optional function had by the actual devices in advance has been activated.

9. A management apparatus for managing a plurality of actual devices and virtual devices each providing an operation constructed by combining functions of the plurality of actual devices, comprising:
   a detection unit adapted to detect a change of an optional function of an actual device;
   an inquiry unit adapted to identify a virtual device in which an attribute to be enabled in correspondence with the optional function, the change of which has been detected by said detection unit, has already been enabled, and to inquire of a user whether or not to change a configuration of the identified virtual device so as to use the actual device of which the change of the optional function has been detected by said detection unit; and
   a reconfiguration unit adapted to change, based on a user instruction in response to the inquiry by said inquiry unit, the configuration of the virtual device so as to use the actual device of which the change of the optional function has been detected by said detection unit,
   wherein, in the case that functions to be provided by the virtual device are restricted upon said changing of the configuration of the virtual device, said inquiry unit inquires of the user together with contents representing that the functions are restricted, whether or not to change the configuration of the virtual device so as to use the actual device of which the change of the optional function has been detected by said detection unit.

10. A method of managing a plurality of actual devices and virtual devices each providing an operation constructed by combining functions of the plurality of actual devices, comprising the steps of:
   detecting a change of an optional function of an actual device;
   changing, in correspondence with the change of the optional function detected in the detecting step, an attribute of a first virtual device including an actual device of which the optional function has been changed;
   determining a second virtual device which has the same attribute as the attribute of the first virtual device that has been changed in the changing step;
   if the determining step determines a second virtual device having the same attribute, changing the configuration of the second virtual device so as to use the actual device of which the change of the optional function has been detected in the detecting step;
   comparing respective actual devices constituting the virtual devices after the configuration of the second virtual device is changed; and managing virtual devices found in the comparison by the comparison made in the comparing step to have the same actual devices by regarding such virtual devices as one virtual device.

11. The method according to claim 10, further comprising the step of, in the case that the second virtual device having the same attribute is determined in the determining step, inquiring of a user whether or not to change the configuration of the second virtual device so as to use the actual device of which the change of the optional function has been detected in the detecting step, wherein in the reconfiguration step, the configuration of the second virtual device is changed so as to use the actual device of which the change of the optional function has been detected in the detecting step, in accordance with a user instruction in response to the inquiry in the inquiring step.

12. The method according to claim 11, wherein in the inquiring step, in the case that functions to be provided by the second virtual device are restricted upon said changing of the configuration of the second virtual device, it is inquired of the user together with contents representing that the functions are restricted, whether or not to change the configuration of the second virtual device so as to use the actual device of which the change of the optional function has been detected in the detecting step.

13. The method according to claim 10, wherein
the optional function of the actual devices includes functions of optional units mounted in the actual devices, and
in the detecting step, a change of an optional function is detected by detecting mounting of an optional unit in an actual device.

14. The method according to claim 13, wherein
the optional unit includes a double-sided unit, a stacker, a finisher, a saddle finisher, and a paper folding unit, and
the attribute includes double-sided printing, sort printing, staple-sort printing, bookbinding printing, and Z-folding printing.

15. The method according to claim 10, wherein
the optional function of the actual devices includes functions implemented by optional data and/or an optional program downloaded to the actual devices, and
in the detecting step, a change of an optional function is detected by detecting downloading of the optional data and/or the optional program.

16. The method according to claim 15, wherein
the optional data and/or the optional program includes a format of a form, font data, and external character data, and
the attribute is a workflow for form printing when the optional data is the format of the form.

17. The method according to claim 10, wherein in the detecting step, it is detected whether or not the optional function had by the actual devices in advance has been activated.

18. A method of managing a plurality of actual devices and virtual devices each providing an operation constructed by combining functions of the plurality of actual devices, comprising the steps of:
detecting a change of an optional function of the actual devices;
identifying a virtual device in which an attribute to be enabled in correspondence with the optional function, the change of which has been detected in said detecting step, has already been enabled, and inquiring of a user whether or not to change a configuration of the identified virtual device so as to use the actual device of which the change of the optional function has been detected in said detecting step;
changing, based on a user instruction in response to the inquiry in said inquiring step, the configuration of the virtual device so as to use the actual device of which the change of the optional function has been detected in said detecting step,
wherein, in the case that functions to be provided by the virtual device are restricted upon said changing of the configuration of the virtual device, an inquiry is made of the user together with contents representing that the functions are restricted, whether or not to change the configuration of the virtual device so as to use the actual device of which the change of the optional function has been detected in the detecting step.

19. A non-transitory computer-readable storage medium storing a program which, when executed, causes the computer to perform a managing method as defined in claim 10.

20. A management apparatus for managing a plurality of actual devices and virtual devices, each virtual device providing an operation constructed by combining functions of the plurality of actual devices, comprising:
detection means for detecting a change of an optional function of an actual device;
change means for changing, in correspondence with the change of the optional function detected by said detection means, an attribute of a first virtual device including an actual device of which the optional function has been changed;
determination means for determining a second virtual device which has the same attribute as the attribute of the first virtual device that has been changed by said change means;
reconfiguration means for, in the case that said determination means determines a second virtual device having the same attribute, changing the configuration of the second virtual device so as to use the actual device of which the change of the optional function has been detected by said detection means;
comparison means for comparing respective actual devices constituting the virtual devices after said reconfiguration means changes the configuration of the second virtual device; and
management means for managing virtual devices found in the comparison by the comparison means to have the same actual devices by regarding such virtual devices as one virtual device.

21. A management apparatus for managing a plurality of actual devices and virtual devices each providing an operation constructed by combining functions of the plurality of actual devices, comprising:
detection means for detecting a change of an optional function of an actual device;
inquiry means for identifying a virtual device in which an attribute to be enabled in correspondence with the optional function, the change of which has been detected by said detection means, has already been enabled, and to inquire of a user whether or not to change a configuration of the identified virtual device so as to use the actual device of which the change of the optional function has been detected by said detection means;
reconfiguration means for changing, based on a user instruction in response to the inquiry by said inquiry means, the configuration of the virtual device so as to use the actual device of which the change of the optional function has been detected by said detection means, wherein, in the case that functions to be provided by the virtual device are restricted upon said changing of the configuration of the virtual device, said inquiry means inquires of the user together with contents representing that the functions are restricted, whether or not to change the configuration of the virtual device so as to use the actual device of which the change of the optional function has been detected by said detection means.

* * * * *